United States Patent
Buchheim et al.

(10) Patent No.: US 9,967,713 B2
(45) Date of Patent: May 8, 2018

(54) LOCATOR BEACON AND RADAR APPLICATION FOR MOBILE DEVICE

(71) Applicant: SSI America, Inc., Ft. Lauderdale, FL (US)

(72) Inventors: James Buchheim, Aventura, FL (US); Arne Hennig, Davie, FL (US)

(73) Assignee: SSI AMERICA, INC., Fort Lauderdale, FL (US)

( * ) Notice: Subject to any disclaimer, the term of this patent is extended or adjusted under 35 U.S.C. 154(b) by 298 days.

(21) Appl. No.: 14/476,805

(22) Filed: Sep. 4, 2014

(65) Prior Publication Data

US 2014/0370917 A1  Dec. 18, 2014
US 2017/0238140 A9  Aug. 17, 2017

Related U.S. Application Data

(63) Continuation-in-part of application No. 14/079,756, filed on Nov. 14, 2013, now Pat. No. 8,847,754, which is a continuation of application No. 13/858,053, filed on Apr. 7, 2013, now Pat. No. 8,878,671, and a continuation-in-part of application No. 13/848,095, filed on Mar. 21, 2013, now abandoned.

(60) Provisional application No. 61/757,244, filed on Jan. 28, 2013, provisional application No. 61/815,755, filed on Apr. 25, 2013, provisional application No. 61/872,780, filed on Sep. 2, 2013, provisional application No. 61/887,388, filed on Oct. 6, 2013,
(Continued)

(51) Int. Cl.
G08B 1/00 (2006.01)
H04W 4/02 (2018.01)
H04W 4/00 (2018.01)
G01S 1/04 (2006.01)

(52) U.S. Cl.
CPC ............ H04W 4/026 (2013.01); G01S 1/042 (2013.01); H04W 4/008 (2013.01); H04W 4/023 (2013.01)

(58) Field of Classification Search
CPC ....... G01S 5/14; H04W 4/008; H04W 64/006; H04W 4/023
See application file for complete search history.

(56) References Cited

U.S. PATENT DOCUMENTS 9,160,742 B1 *  10/2015  Ackerman .......... H04L 63/0853
2013/0028246 A1 *  1/2013  Gonikberg ............ H04W 64/00
370/338
(Continued)

Primary Examiner — Omeed Alizada
(74) Attorney, Agent, or Firm — Sheridan Ross P.C.

(57) ABSTRACT

A locator beacon, method and system for identifying a first-in-line device, including: a first antenna configured to send a first signal; a second antenna configured to send a second signal and spaced apart from the first antenna such that a delta value between a first Received Signal Strength Indicator (RSSI) value of the first signal and a second RSSI value of the second signal measured at a predefined location, is within a range of values; a receiver for receiving wireless signals configured to receive an authentication signal from a mobile device adapted to measure the first and second RSSI values, the authentication signal including authentication data related to the measured RSSI values; and a processing unit, configured to determine whether the mobile device is the first-in-line device based on whether a delta value between the first RSSI value and the second RSSI value is within a predefined value range.

18 Claims, 19 Drawing Sheets

Related U.S. Application Data provisional application No. 61/891,932, filed on Oct. 17, 2013, provisional application No. 61/745,824, filed on Dec. 26, 2012, provisional application No. 61/726,613, filed on Nov. 15, 2012.

(56) References Cited

U.S. PATENT DOCUMENTS

| | | | |
|---|---|---|---|
| 2013/0084801 A1* | 4/2013 | Royston | G06K 7/015 455/41.1 |
| 2013/0099998 A1* | 4/2013 | Lin | H01Q 1/38 343/893 |

* cited by examiner

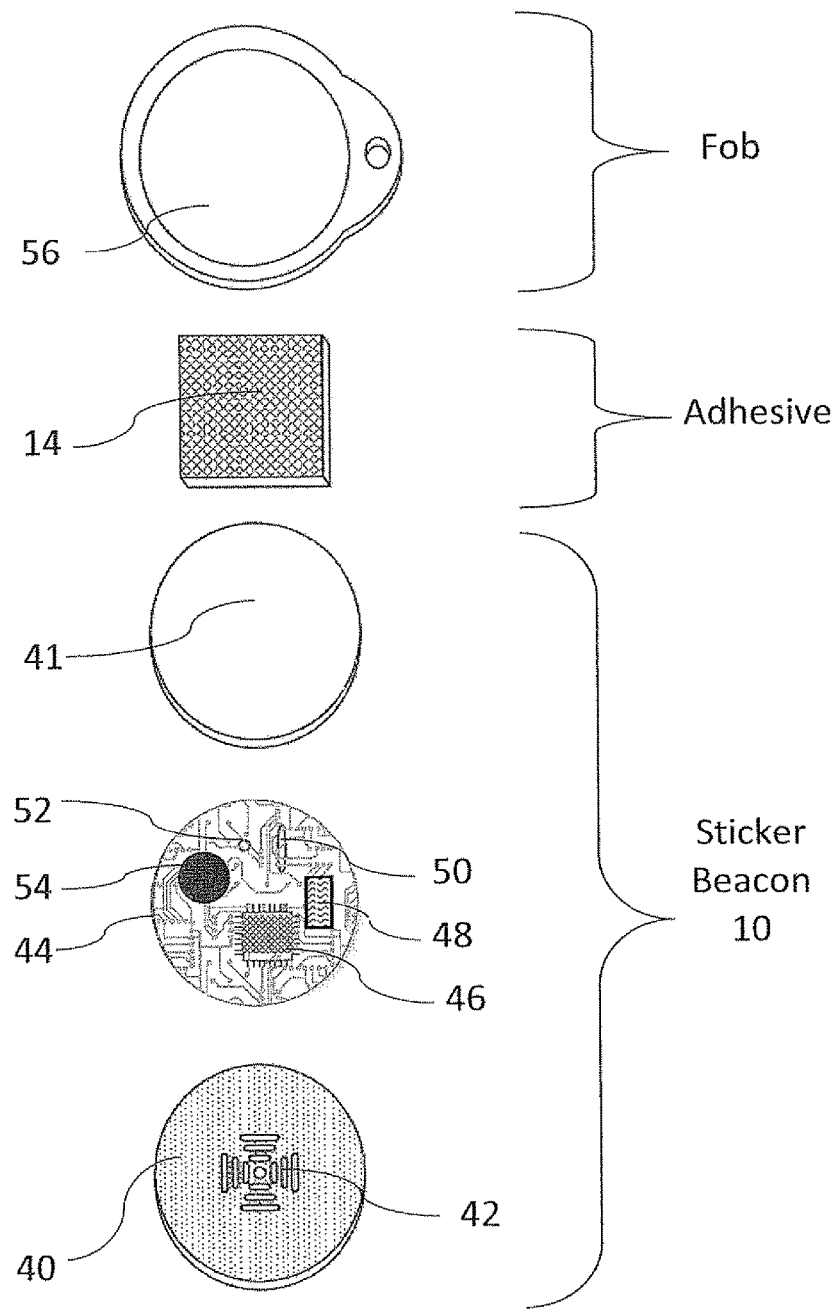

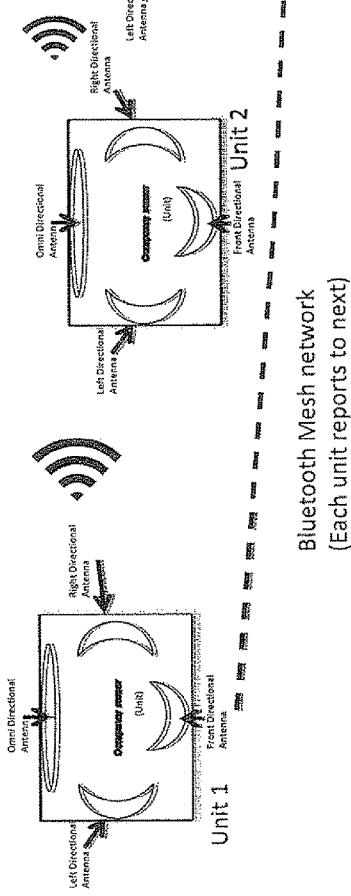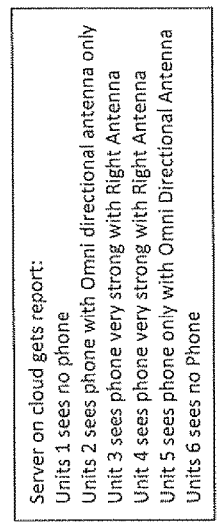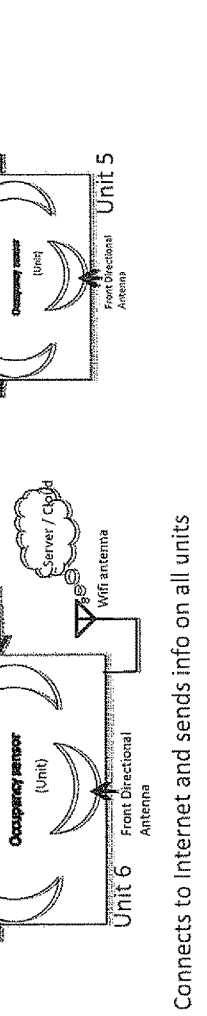
FIG. 12

Top View
FIG. 15A
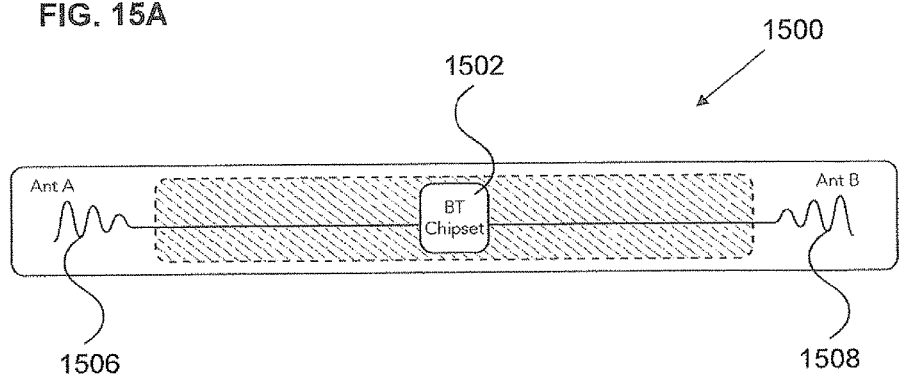
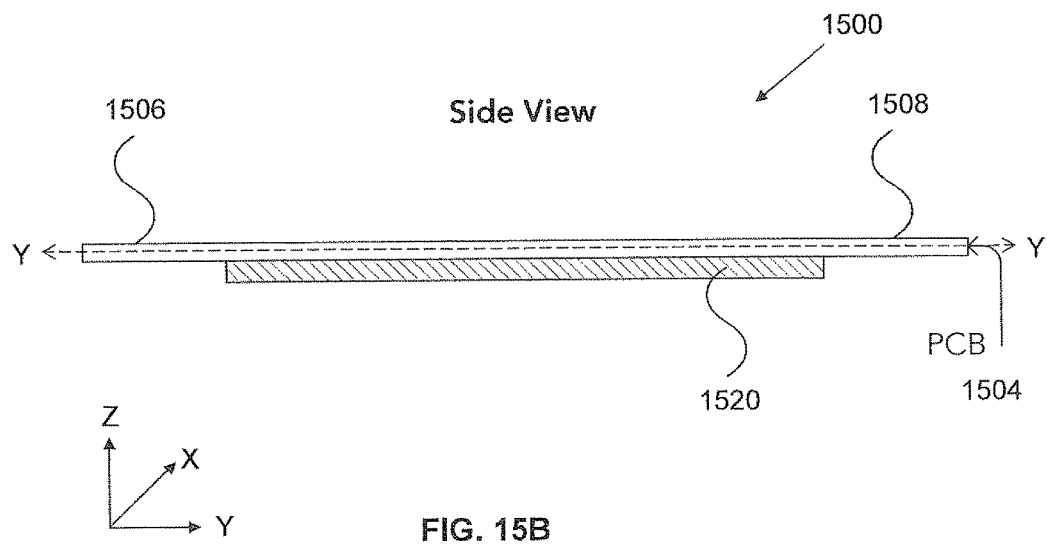
FIG. 15B

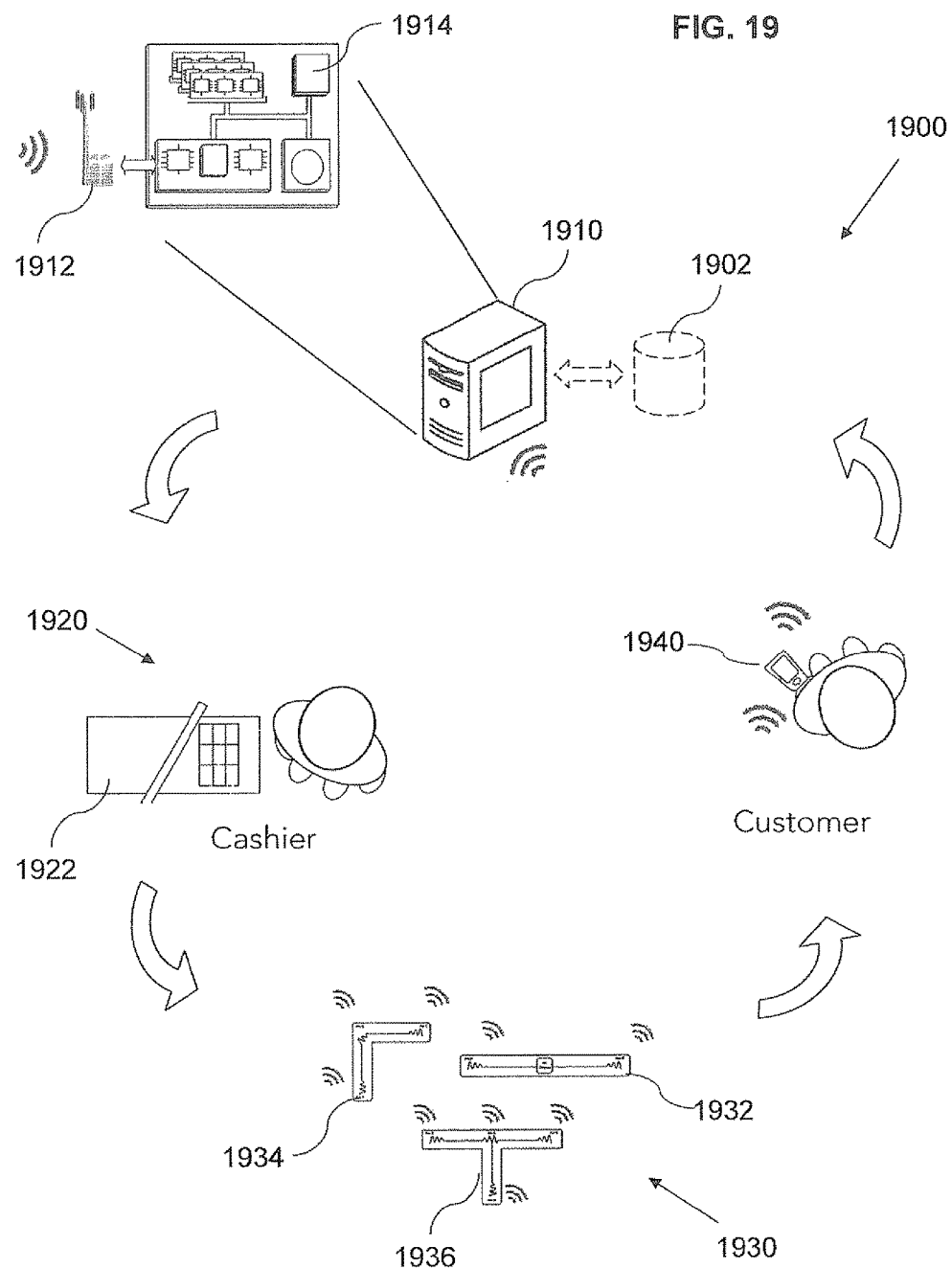

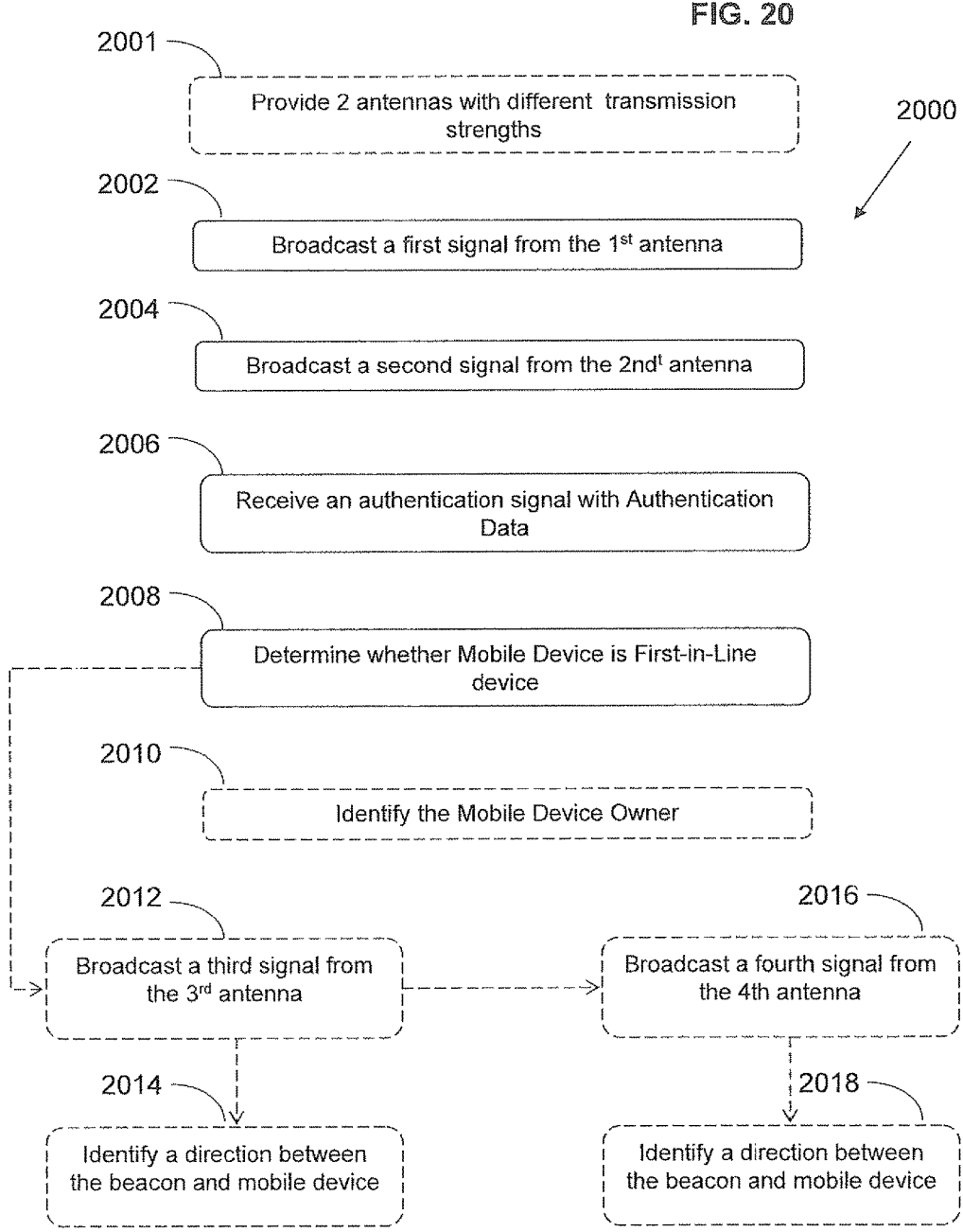

FIG. 21A
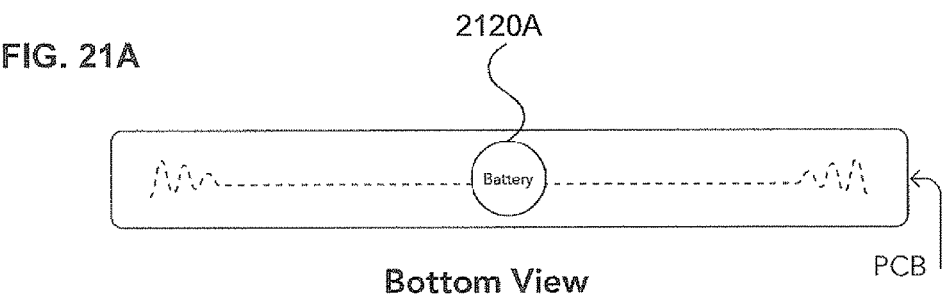
FIG. 21B
FIG. 21C
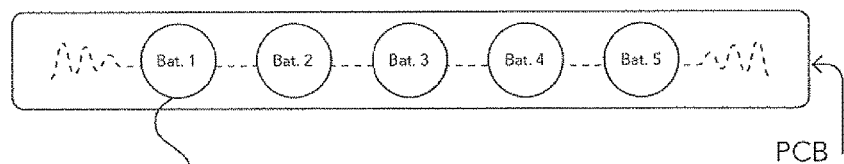
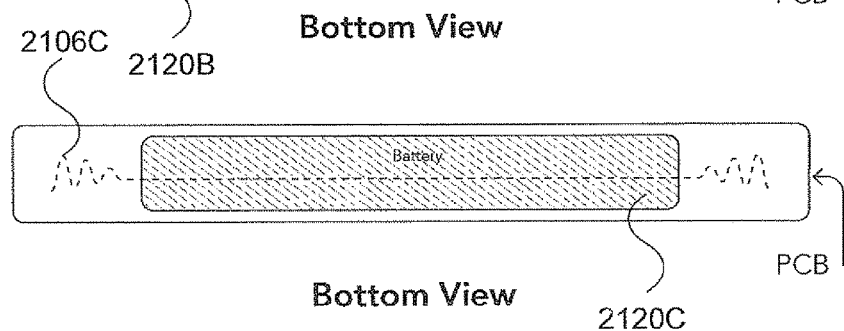
FIG. 21D
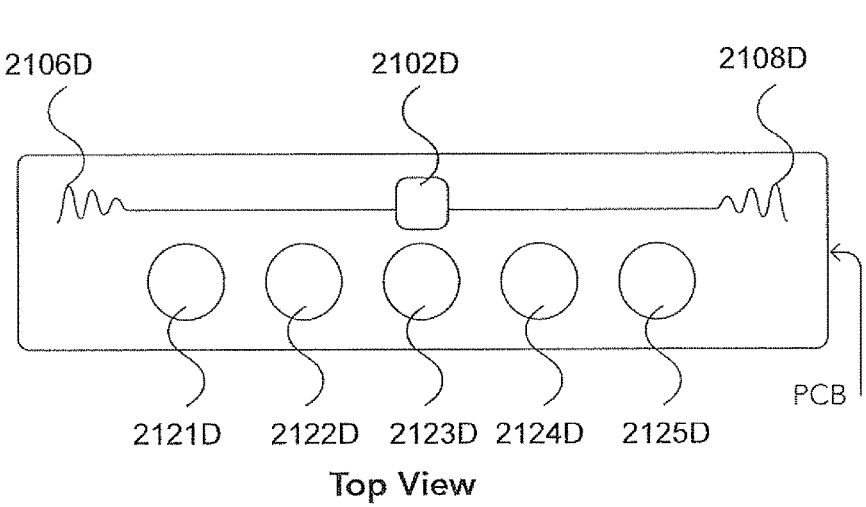

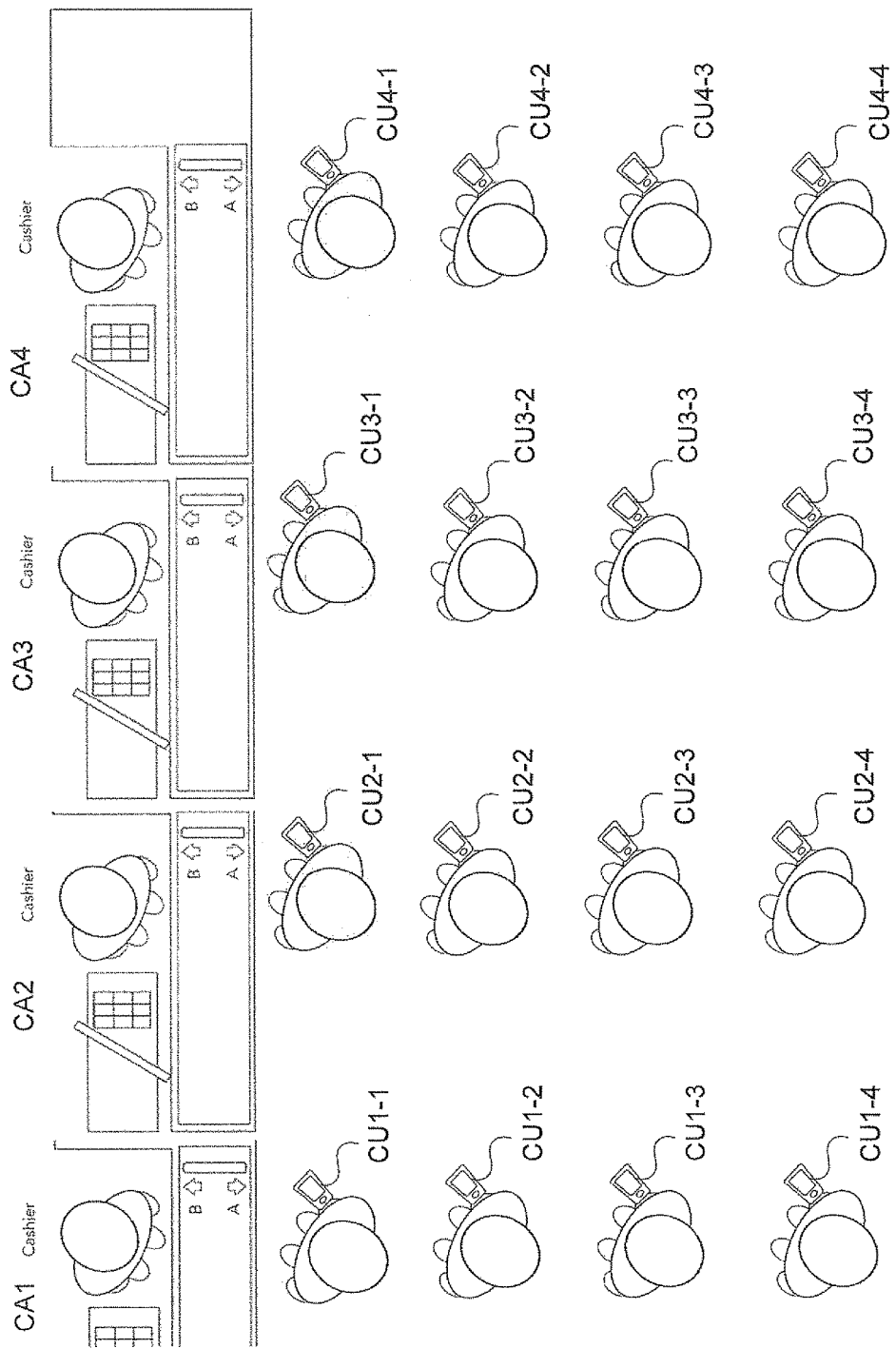

LOCATOR BEACON AND RADAR APPLICATION FOR MOBILE DEVICE

CROSS REFERENCE TO RELATED APPLICATIONS

This application is a continuation-in-part of pending U.S. patent application Ser. No. 14/079,756, filed Nov. 14, 2013, which is a continuation U.S. provisional patent applications 61/757,244 filed Jan. 28, 2013, 61/745,824 filed Dec. 26, 2012, 61/815,755 filed Apr. 25, 2013 and 61/872,780 filed Sep. 2, 2013 and which is a continuation-in-part of U.S. patent application Ser. No. 13/858,053, filed Apr. 7, 2013 which is a continuation of U.S. provisional patent application 61/726,613, filed Nov. 15, 2012, and a continuation-in-part of U.S. patent application Ser. No. 13/848,095 filed Mar. 21, 2013, the disclosures of which are expressly incorporated herein by reference in their entireties.

BACKGROUND OF THE INVENTION

1. Field of the Invention

The present invention relates to a locator beacon, and particularly to a Bluetooth™ or Bluetooth Low Energy (BLE) locator beacon. The beacon can be located using a mobile computing and communications device running a complementary application.

2. Background Information

Bluetooth Low Energy (BLE) is a feature of Bluetooth 4.0 wireless radio technology, aimed at new, principally low-power and low-latency, applications for wireless devices within a short range (up to 50 meters/160 feet). This facilitates a wide range of applications and smaller form factor devices.

One important difference between BLE and Classic Bluetooth is that, to obtain simpler and cheaper radio chipsets, BLE uses only 40 channels, 2 MHz wide, while Classic Bluetooth uses 79 channels, 1 MHz wide. Three of these channels, which are located exactly between the Wireless LAN channels, are used for device discovery and connection setup. These channels (also known as "advertising" channels) are used by the technology to search for other devices or promote its own presence to devices that might be looking to make a connection. In comparison, Classic Bluetooth technology uses 32 channels for the same task. This drastic reduction is one more trick that BLE uses to minimize time on air, so as to reduce power consumption. BLE has to switch "on" for just 0.6 to 1.2 ins to scan for other devices using its three advertising channels. Classic Bluetooth, instead, requires 22.5 ms to scan its 32 channels. The power savings are significant: BLE consumes 10 to 20 times less power than Classic Bluetooth technology to locate other radios.

SUMMARY OF THE INVENTION

According to the present invention there is provided a locator beacon including: (a) a first antenna configured to send a first signal; (b) a second antenna configured to send a second signal, the second antenna spaced apart from the first antenna such that a delta value between a first Received Signal Strength. Indicator (RSSI) value of the first signal and a second RSSI value of the second signal measured at a predefined distance range, is within a predefined value range.

According to further features in preferred embodiments of the invention described below the first antenna has a different signal transmission strength to the second antenna.

According to still further features in the described preferred embodiments the beacon further includes (c) a third antenna configured to send a third signal, the third antenna located in a known position relative to the first and second antennas such that measuring the first and second RSSI values and a third RSSI value of the third signal enables a measuring device to determine a direction between the measuring device and the locator beacon.

According to still further features the locator beacon further includes: (d) fourth antenna configured to send a fourth signal, the fourth antenna located in a known position relative to the first, second and third antennas such that measuring the first, second and third RSSI values and a fourth RSSI value of the fourth signal enables a measuring device to determine a direction between the measuring device and the locator beacon.

According to still further features the first and second antennas define an axis along which a line runs, such that the predefined approximate location intersects the line.

According to another embodiment there is provided a system for identifying a first-in-line device, the system including: (a) a first antenna configured to send a first signal; (b) a second antenna configured to send a second signal, the second antenna spaced apart from the first antenna such that a delta value between a first Received Signal Strength Indicator (RSSI) value of the first signal and a second RSSI value of the second signal measured at a predefined distance range, is within a predefined value range; (c) a receiver adapted to receive wireless signals, the receiver configured to receive an authentication signal from a mobile device adapted to measure the first RSSI value and the second RSSI value, the authentication signal including authentication data related to the measured RSSI values; and (d) a processing unit, the processing unit configured to determine whether the mobile device is the first-in-line device based on whether a delta value between the first RSSI value and the second RSSI value is within a predefined value range.

According to further features the authentication data includes the first and second measured RSSI values.

According to still further features the authentication data includes the delta value.

According to still further features the processing unit is further configured to identify a mobile device owner based on the authentication signal received from the mobile device, wherein the authentication signal includes a unique user identifier related to the mobile device owner.

According to still further features the locator beacon further includes: (e) a third antenna configured to send a third signal, the third antenna located in a known position relative to the first and second antennas, wherein the authentication data is further related to a third RSSI value of the third signal measured by the mobile device, and wherein the processing unit is further configured to determine a direction between the mobile device and the locator beacon, based on the authentication data.

According to still further features the locator beacon further includes: (f) a fourth antenna configured to send a fourth signal, the fourth antenna located in a known position relative to the first, second and third antennas, wherein the authentication data is further related to a fourth RSSI value of the fourth signal measured by the mobile device, and wherein the processing unit is further configured to determine a direction between the mobile device and the locator beacon, based on the authentication data.

According to still further features the processing unit is further configured to determine whether the mobile device is in a respective predefined position based on whether the delta value is within a predefined range of values specific to the respective predefined position.

According to another embodiment there is provided a method for identifying a first-in-line device, the method including the steps of: (a) broadcasting a first signal from a first antenna; (b) broadcasting a second signal from a second antenna; (c) receiving an authentication signal from a mobile device, the mobile device measuring a first Received Signal Strength Indicator (RSSI) value of the first signal and a second RSSI value of the second signal, the authentication signal including authentication data related to the measured RSSI values; and (d) determining whether said mobile device is the first-in-line device, based on whether a delta value between the first RSSI value and the second RSSI value is within a predefined value range.

According to still further features the authentication data includes the first and second measured RSSI values.

According to still further features the authentication data includes the delta value.

According to still further features the method further includes the step of: (e) identifying a mobile device owner based on the authentication signal received from the mobile device, wherein the authentication signal includes a unique user identifier related to the mobile device owner.

According to still further features the first antenna and the second antenna are embodied on a single substrate.

According to still further features the method further includes the steps of: (f) broadcasting a third signal from a third antenna, the first, second and third antennas positioned in a known configuration; and (g) identifying a direction in which the mobile device is located relative to the first, second and third antennas, based on the known configuration.

According to still further features the method further includes the steps of: (0 broadcasting a third signal from a third antenna; (g) broadcasting a fourth signal from a fourth antenna, the first, second, third and fourth antennas positioned in a known configuration; and (h) identifying a direction in which the mobile device is located relative to the first, second, third and fourth antennas, based on the known configuration.

According to still further features the method further includes the step of: (e) adjusting power of one of the first and second antennas, step (e) being performed before step (a).

According to still further features the method further includes the step of: (e) providing the first antenna having a first transmission strength and the second antenna having a second transmission strength different from the first transmission strength, step (e) being performed before step (a).

BRIEF DESCRIPTION OF THE DRAWINGS

Various embodiments are herein described, by way of example only, with reference to the accompanying drawings, wherein:

FIG. 4 is a semi-schematic exploded view of an embodiment of the innovative sticker beacon and a key-ring fob;

FIG. 12 is a diagram of Mesh Network of occupancy sensors with only one WiFi or Cellular unit;

FIG. 15A is a top view of an exemplary locator beacon of immediate invention;

FIG. 15B is a side view of an exemplary locator beacon of immediate invention;

FIG. 19 is a diagram of a system of the present innovation;

FIG. 20 is a flow diagram of a method for identifying a first-in-line device;

FIG. 21A-21D are additional exemplary configurations of the locator beacon;

FIG. 22 is an exemplary use-case scenario of the innovative system.

DESCRIPTION OF THE PREFERRED EMBODIMENTS

The principles and operation of a Bluetooth locator beacon and mobile app according to the present invention may be better understood with reference to the drawings and the accompanying description.

The principles and operation of a Bluetooth enabled beacon and mobile app according to the present invention may be better understood with reference to the drawings and the accompanying description.

Beacon

Figure 1A:
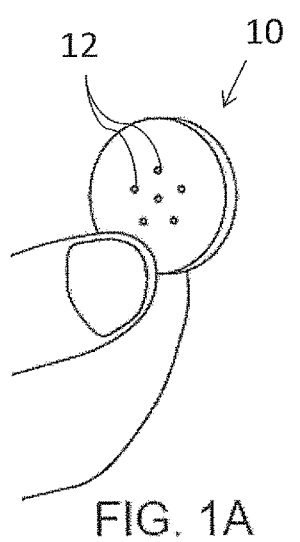
FIG. 1A is a pictorial depiction of a front view of an embodiment of the innovative sticker beacon.

Referring now to the drawings, FIG. 1A illustrates a pictorial depiction of an isometric front view of an innovative sticker beacon 10 held between a person's fingers. FIG.

Figure 1B:
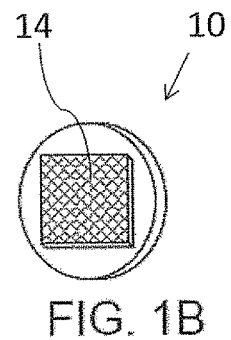
FIG. 1B is a pictorial depiction of a back view of the embodiment of FIG. 1.

1B is an isometric back view of sticker beacon 10. Referring to both FIGS. 1A and 1B, beacon 10 include integrated speaker holes 12. Speaker holes 12 allow sound from an integrated buzzer (not shown here) to be heard. Speaker holes 12 also allow an integrated LED (not shown here either) to be seen when active. An adhesive means 14 is visible mounted on the back of beacon 10. Sticker beacon 10 can be attached to virtually any substantially flat surface with the aid of adhesive 14. Preferably, the sticker beacon is non-removeably attached to the desired surface via the adhesive. The relatively small size of sticker 10 together with adhesive backing 14 allows the sticker to be used in a wide variety of situations.

Preferably the adhesive used is 3M® VHB® or equivalent adhesive. 3M® VHB® adheres to most surfaces and achieves a full strength bond in approximately one hour. Preferably the adhesive is capable of adhering to surfaces including at least: glass, painted surfaces, metal, painted/sealed wood & concrete, outdoor & harsh environmental applications, plastics, leather, etc.

Figure 2:
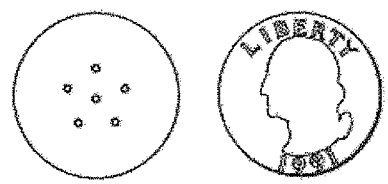
FIG. 2 is a pictorial representation of the innovative beacon sticker of the immediate invention shown next to a US quarter Dollar coin.
Figure 3A:
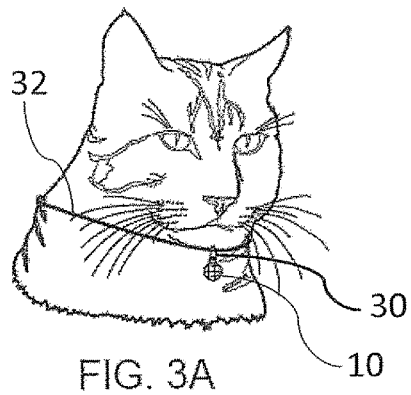
FIG. 3A-3D are pictorial depictions of the innovative beacon in use.
Figure 3B:
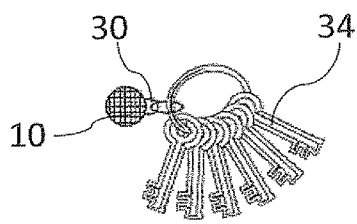
Figure 3C:
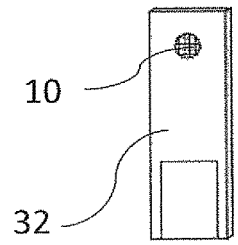
Figure 3D:
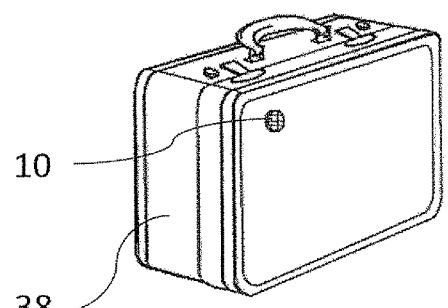

FIG. 2 is a pictorial representation of the innovative beacon sticker of the immediate invention shown next to a US quarter Dollar coin. The size of the currently depicted embodiment of sticker 10 is clear from the context of the comparison between sticker 10 and a quarter Dollar coin 20 depicted in FIG. 2.

FIGS. 3A to 3D are pictorial depictions of the innovative beacon in use. The beacon is about the size of an American Quarter Dollar coin (see FIG. 2) and ⅛ of an inch (3.5 mm) thick. The dimensions of the beacon allow the device to be attached unobtrusively to most objects. For example, sticker beacon 10 can be adhered to a TV remote control 32 (see FIG. 3C), a set of keys 34 (when mounted on a fob 30) (see FIG. 3B), a pet collar 36 (see FIG. 3A—also mounted on a fob 30), a suitcase 38 (see FIG. 3D) or any other object that is often looked for.

FIG. 4 is a semi-schematic exploded view of an embodiment of the innovative sticker beacon 10 and a key-ring fob 30. In the Figure, a front cover 40 includes speaker holes 42 (similar in function to speaker hole 12 of FIG. 1, although having a slightly different configuration). A back cover 41 is adapted fittingly close together with front cover 40.

A round circuit board 44 is enclosed by back and front covers 40/41 of the sticker 10. Circuit board 44 includes a computing chip 46 for effecting all of the relevant processing logic. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A wireless communication component 48 effects all Bluetooth and BLE related functionality (e.g. sending and receiving signals/data etc.). Preferably, wireless communication component 48 includes an RSSI module for measuring the signal strength of RSSI values received at the component. In some embodiments, component 48 is capable of effecting other types of wireless communication (all well known in the art) in addition to, or in place of, Bluetooth communication. An LED 50 (or other illumination means) emit a visual alert (such as emitting a solid light or flashing alert) in accordance with relevant or corresponding instructions (discussed below). In some embodiments, light from LED 50 is visible through speaker holes 42. In other embodiments, illumination from LED 50 is visible through a transparent section (not shown) of either front cover 40 or back cover 41 or area of connection between the two. An audio component 52 enables sticker 10 to emit an audible sound such as a buzzer. Both the illumination function and sound function enhance the user's ability to find the beacon, as will be discussed in further detail below. A battery 54, such as a watch battery or button cell, is replaceably attached to board 44. In some preferred embodiments of the invention battery 54 is capable of working approximately thirty minutes per day for one year. Of course the longevity of the battery life is dependent on a myriad of factors such as environmental factors, use, exact battery type, manufacture and many more. It is to be understood that the depicted size and shape of battery 54 are merely exemplary and in no way limiting. Furthermore, the location, shape, size, etc. of any of the aforementioned components on circuit board 44 are merely exemplary or representative of the named components and not intended to be limiting. It is also to be understood that circuit board 44 includes additional elements and/or variations of the named components and/or combinations of the represented components. Therefore, the depicted components are merely representative of components capable of fulfilling the described functions.

Adhesive means 14 is adapted to be attached to back cover 41 and further adapted to adhere to almost any substantially flat surface. A key fob (or 'keychain holder', keychain fob, key-ring fob or simply 'fob' as referred to hereinafter) 56 is an optional addition to sticker beacon 10. Fob 56 allows sticker 10 to be attached to objects that do not have useable flat surfaces. For example, a set of keys cannot comfortably house a Bluetooth sticker 10 unless the sticker is attached to fob 56 and mounted on the key-ring. Fob 56 includes an eyelet 58 which allows the fob to be mounted on a key-ring, thread, necklace etc. This enables the sticker to be very small, without any keychain hole. Sticker 10 is mounted on fob 56 with adhesive 14. While the invention has been described with respect to a round form, it is made clear that any appropriate shape that is capable of housing the same or substantially similar components is included within the scope of the invention.

Mobile Application

The mobile application is preferably adapted for use on a cellular mobile communication device such as a smart phone. More preferably, the application is adapted for use on a smart phone enabled with Bluetooth technology, and most preferably with a mobile device enabled with Bluetooth Low Energy (BLE) capabilities. Of course, the mobile application can be installed and run on any mobile/handheld device designed and configured to support the mobile application (e.g. iPad™, iPod™, mini-iPad™, tablet computer, PDA and the like).

Furthermore, although less preferable, in some embodiments of the invention, the mobile application is supported on mobile platforms (smart phones, PDAs, Tablet computers etc.) which are only Bluetooth (versions 1.0 to 3.0) enabled, not Bluetooth Low Energy (version 4.0) enabled. In such embodiments, the corresponding beacon(s) locatable by the devices are also/alternatively Bluetooth 1.0-3.0 enabled and/or compatible.

In some further embodiments (not shown), the beacon is alternatively or additionally WiFi enabled, allowing the beacon to be tracked via the WiFi signal using an embodiment of the mobile application adapted to locate the beacon using WiFi. In some embodiments sticker 10 additionally and/or alternatively includes a cellular communications component capable of effecting (receiving and/or sending) cellular voice (i.e. telephonic) or data (wireless cellular data) communication. In some embodiments, sticker 10 alternatively and/or additionally includes a component capable of satellite and/or OPS communication (i.e. communication with a GPS and/or GPS-like satellites).

The innovative mobile application includes computer-readable instruction/logic embodied in software and/or firmware and/or hardware and stored on computer-readable memory component. Such a memory component may be a read-only memory, random access memory, non-volatile memory, volatile memory, static memory, dynamic memory, flash memory, cache memory, and/or any device that stores digital information. The computer-readable instructions/logic can be process by an appropriate processing unit. The innovative application includes, at least the following features:

Radar Screen

Figure 5:
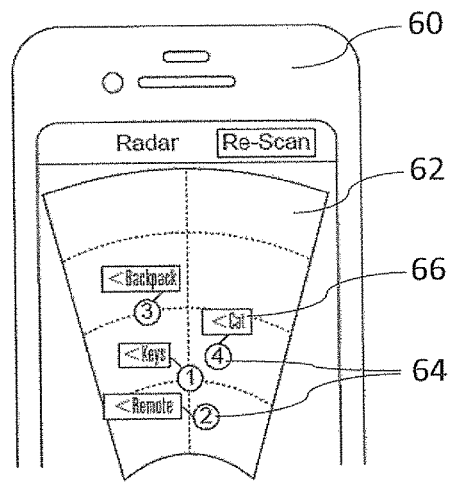
FIG. 5 is a partial screen shot of a smart phone running an innovative 'Radar Screen' feature of the mobile application of the present invention.

The first feature is a simple Radar Screen. FIG. 5 is a partial screen shot of a smart phone running a 'Radar Screen' feature of the mobile application of the present invention. When activating the Radar Screen feature on a mobile device 60 running the innovative application, some or all of the beacons/objects in range on a radar-type screen 62. Of course, as Bluetooth cannot show direction, radar screen 62 approximates the distance from the mobile device to Stick-N-Find 10, but not the direction. Therefore, once the beacon of the object being sought appears on Radar Screen 62, then walking in a specific direction, will give an indication of whether phone 60 is coming closer to the beacon or moving farther away. In this manner, the user is able to deduce which direction is the correct direction to follow and move in the appropriate direction until the beacon/object is located (very much like the hot/cold game children play, where an object is hidden and the seeker is 'directed' to the object with hints in the form of varying degrees of temperature as a guide: warm, hot being close and cool, cold being far—as is well known). Each beacon 10 that is paired with phone 60 can be labeled with a name tag 66 for easy recognition.

Distance between Bluetooth sticker 10 and phone 60 is measured using Received Signal Strength Indicator (RSSI) values. RSSI is a measurement of the power present in a received radio signal. In one embodiment, the RSSI values of phone 60 provide the distance measurement. This is a less preferred embodiment, as phone signal reception is not optimal. In other, more preferred embodiments, RSSI levels on sticker 10 are measured for distance values. Sticker 10 is paired to phone 60 and measures RSSI levels from sticker 10 to phone 60. Sticker 10 then sends the data over bluetooth to phone 60. Therefore, when phone 60 displays the approximate distance between sticker 10 and phone 60, radar-screen 62 is really displaying the RSSI values measured at the sticker, then sent to phone. Not the RSSI values measured at the phone. In other embodiments any combination of RSSI values from both the phone and the sticker can be processed to provide a more accurate result.

In some preferred embodiments, when the Locator Tag 10 replies to an active scan request, the RSSI value of the scan request signal (sent from the phone to the Tag), is embedded in the designation or 'Name' field of the Tag broadcast signal. This means that when a phone scans and detects a Locator Tag, the name that the Tag broadcasts contains the actual estimated distance between the phone and the Tag in dB values and can display the Channel that this dB values was from.

In some preferred embodiments, when the Locator Tag receives an Active Scan request, it can calculate which channel the best Signal was measured on, and reply to the phone as a Scan reply, as part of the Beacon name, or in the manufactures data, the best Channel the signal was measured and the RSSI value.

As mentioned above, Bluetooth Low Energy uses 40 channels. Out of those 40 channels, up to 37 channels are used during an active connection and 3 channels are used for advertising. Because of different signal attenuation for each of those channels there is usually a difference between the RSSI values of each channel. Therefore, in an even more preferable embodiment, the innovative application uses RSSI values measured independently for each channel and combines the values in order to receive an average value. The averaging operation performed on the RSSI values takes into account the different characteristics of each channel. The average value is more accurate and reliable than results for any single RSSI value.

The averaging process can be performed on up to 37 channels when there is an active connection between the phone and the sticker. During scanning, the sticker can transmit different data packets for each of the 3 advertising channels. This enables the phone to do the same kind of processing mentioned above, for those 3 advertising channels (i.e. receiving RSSI values from up to 3 channels). In the event that the signal is not good enough for an active connection between the Sticker and the Phone, the application in the phone will fall back to scan mode, and try to estimate distance based on RSSI values from at least one of the advertising channels.

In another embodiment, if the sticker is in the advertising mode it can broadcast the RSSI values measured using the packets sent from the phone, as a broadcasted response to the scan request. This means the Sticker response to the phone would contain the RSSI measurement from the phone.

In some embodiments the averaging procedure mentioned above can be done on any of the 40 available channels. That is to say that RSSI values can be received from between 1 and 40 channels and an average value calculated from the received RSSI values will give the most accurate measure of distance.

In another embodiment, if the sticker is in the advertising mode, instead of transmitting the advertising in all 3 channels one after another as designed, it can advertise in only one Channel, include the Channel name, as part of the advertising identifier, or part of the Beacon name. Then pause Wait enough time so that the device/phone will monitor for new advertisement, (Say 50 ms or more) and then transmit the same advertisement but on the second channel, with the second channel name embedded, and not transmit any other advertisement immediately, but wait say 50 ms, then transmit the same advertisement but on the third channel, with the Third channel name embedded. This Scheme would allow the phone not to mix and average all 3 channels, but to actually display the real RSSI level of each individual channel.

This would give a much better accuracy RSSI distance estimate to the phone, as the phone can determine what Channel is best, and what channel its frequency might be blocked or bad.

In some embodiments of the invention, the sticker has an Advertising Mode where the signal can be picked up by the phone. When the phone is in scanning mode it picks up the signal from the beacon. The Beacon detects nearby phones when it receives a Scan request from the phone. Adding an adaptive algorithm to the Sticker logic, if no BLE devices (Phones) are visible to/detected by the sticker, then the sticker dynamically adjusts its advertisement packets.

Therefore, if no phones are visible, the sticker can adjust the interval advertisement to every 10 seconds, for example. Once devices are detected by the Sticker, it will adjust the interval rate up to 100 ms or faster, depending on how saturated the area is with scanning BLE devices.

In some embodiments, when the sticker is actively connected to the phone, the sticker is in a Connectivity Mode. In the connectivity mode, the sticker can communicate with the phone over the other 37 communication channels.

In some special cases the three advertising channels can also be used for communication in broadcast communication mode. In some embodiments, the advertisement packet supports multiple protocols in one packet. In such embodiments, the multiple protocols are all in one advertisement packet, or the advertising channel supports a chain of protocols (Interleave), each sent in a separate advertisement packet. For example, one Ad packet contains protocol A, B and C; or in Daisy chain of packets: Protocol A, then B then C. Exemplarily, Protocol A can be say, Nokia, protocol B can be Apple's iBeacon, and C be Google's protocol.

Another method for transmitting different Protocols, is by combining them and sending advertisement of each 2 or more protocols one after the other with almost no delay. This method saves power, as the radio, DC/DC etc are already on, and do not need to power off, then on again.

Another method for combing different protocols, is sending different protocol advertisements on the 3 different advertisement channels.

So Channel 37 can advertise Apple's payload protocol, Channel 38 can advertise Google payload protocol, and channel 39 can advertise Nokia payload protocol for example.

Buzz-Flash

When an indication icon 64 of a beacon 10 appears on radar screen 62, a user can touch/tap or otherwise select a desired beacon-icon 64 on the screen and send a command signal to the corresponding beacon. One such command signal instructs the selected sticker to emit an auditory noise (e.g. make a buzzing sound or the like). In some embodiments, speaker 52 facilitates this auditory function. When the selected Bluetooth sticker 10 makes a noise, the user can more easily locate the beacon.

Another command signal instructs a selected beacon 10 to emit some form of illumination such as flashing (i.e. light up LED 50 in beacon 10). The 'flash' function is useful when making a noise is either inconvenient or ineffective. Of course the 'buzz' function or 'flash' function can be used either separately or together.

Find It

Figure 6:
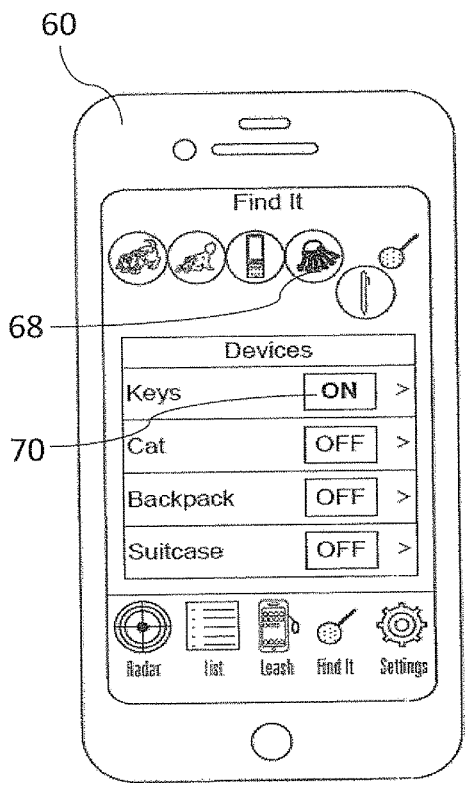
FIG. 6 is a screen shot of a smart phone running a 'Find It' feature of the innovative mobile application.

FIG. 6 is a screen shot of a smart phone 60 running a 'Find It' feature of the innovative mobile application. The "Find IT" Feature is used when searching for a missing sticker 10, i.e. when the beacon is not in range of phone 60. A user activates a find feature for a desired object/beacon 68 by selecting a switch 70 for the tagged object. Once the desired beacon comes back into range, then phone 60 issues an alert. The alert notifies the user that the beacon is back in range.

An example where the Find It feature can be useful is when a user sticks a Stick-N-Find beacon 10 on a piece of baggage 38 (see FIG. 3D) which is checked-in on a flight. When the suitcases start coming out onto the conveyer belt, the user can simply sit down and wait comfortably on the side. When the piece of baggage comes into range, phone 60 issues an alert, signaling to the user that baggage 38 is near. Only at this point does the user need to get up, and take the luggage. A user can also stick a Stick-N-Find 10 on his wife's car. Once she pulls into the driveway, the user gets a notification, cleans his mess, and goes to wash dishes before she comes in.

Virtual Leash

Figure 7:
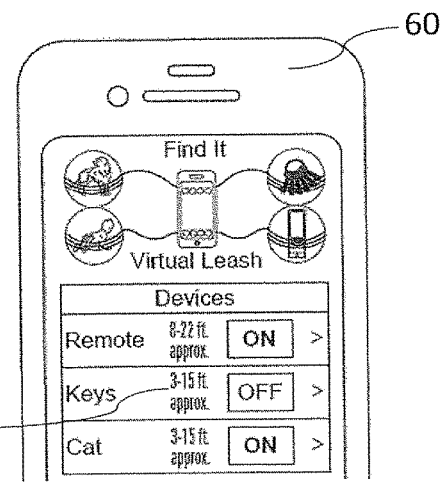
FIG. 7 is a partial screen shot of a smart phone running a 'Virtual Leash' feature of the innovative mobile application.

FIG. 7 is a partial screen shot of a smart phone running a 'Virtual Leash' feature of the innovative mobile application. The Virtual Leash feature allows a user to create a 'virtual leash' on a selected beacon 10, so that if the beacon (e.g. a sticker threaded on the shoe laces of a child) moves farther away than a selected approximate distance 72 from phone 60, the application issues an alarm from the phone. In essence, the Virtual Leash feature is the opposite of the Find It feature.

Different types of alarms can be selected and unique alarms can be selected for each beacon 10 (e.g. a chime sounds if your handbag is distanced from your phone, but when a pet is out of range, then a message flashes on the screen of the phone and if a child is out of range then a siren alarm is issued). In some preferred embodiments, Virtual Leash is a two way function, where both beacon 10 and phone 60, can issue an alert. For example, should a user have car keys in his pocket but leave the phone on the kitchen table, then both the phone and sticker will buzz and/or flash when out of range from each other. In this manner, it is the beacon that alerts the user to fact that he has left the phone in the house. Of course there are situations where it is preferable to active the alarm on only one of the two components (e.g. only activate alerts on the phone but not on a beacon connected to a child's shoe or a pet collar).

Because BT signal is on 2.4 Ghz, this signal can easily be absorbed by humans, blocked or reflected by any object etc. This means that if a user creates a leash with his kids, or wallet, and then blocks the signal with his body, the leash can be broken.

Also in a home, when you create a leash with a sticker in your keys, if you go behind a wall, or something comes in between you and the keys, this will cause a false alarm on both the phone and sticker.

In another embodiment of the feature, the phone tracks the RSSI signal of the sticker if the app notices that the signal is weakening at a steady and fixed ratio that can be correlated to a steady and fix speed moving away from the phone, then the app calculates that the virtual leash will be broken in X seconds should the sticker continue to move away from the phone. With this information, when the app detects that the leash is broken, the likelihood that the alert is true and that the least has indeed been broke is increased/confirmed.

But if the correlated Speed of the object moving away, suddenly moves away at speeds that don't make sense, and then the leash is broken, the likelihood that the leash was truly broken decreases and the phone will try to re-establish a link. This additional feature lowers the rate of false alerts stemming from obstructions.

Direction of Lost Item Estimator:

It is very hard and important to know the direction of a lost item. The locator feature of the app displays the RSSI signal. The RSSI Signal can be roughly correlated to distance in feet/meters. (It is not an actual determination but can show an approximate distance between the phone and the lost Sticker.)

The 360 Turn Feature

A human arm is about 2-3 feet long (center of body to hand). By starting a circular turn around a fixed spot, a user will turn at a diameter that can be anywhere 5 to 6 feet. While turning, the phone measures RSSI levels at a very fast rate: e.g. 100 ms or faster. The processor/app logic correlates the RSSI measurements with the phone's built in Accelerometer and Gyro. Once the 360 degree circle is completed, the app displays a direction in which the RSSI signal was the strongest.

Additional Method

It has been determined that the BT antennae in most phones are somewhat directional. There are even slight changes within the same model. Based on this determination, a calibration method can be used to map the directional qualities of the particular phone:

Download the app to the phone and place a sticker about 20 feet away from the phone. Press the calibration button, point the phone towards the sticker and press start.

Turn the phone in a 360 degree circle.

Once the circle is completed and the phone is back in the original position the calibration process is complete.

The phone's app knows the exact direction of the sticker, because you pointed the phone to the sticker. The app it will match the RSSI received with the Accelerometer and Gyro data. This will enable the phone to create a map of the antenna's directional qualities.

Then when an item is lost, just turn around with the phone, and based on this map, the phone will determine the direction to the lost item.

L-Shaped Method

Also, a user can walk in an L shape, being guided by the app, and the phone will know the direction and distance from the phone to the sticker.

Distance can be calculated by calculating the signal change when, walking the L shape. Furthermore, the direction can be calculated using the Mapping calibration mentioned above.

Task Launcher

An optional feature of the innovative application is a Task Launcher Feature. Task Launcher is capable of causing certain changes to mobile devices when they come within range of the beacon. For example a beacon 10 can be placed at the door to a conference room causes mobile devices passing by to go into 'Silent' mode.

Directional Antenna(e) and Triangulation

Figure 4A:
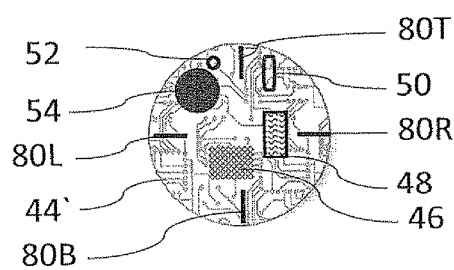
FIG. 4A is a schematic diagram of a further embodiment of circuit board of a locator beacon of the immediate invention.

FIG. 4A depicts a schematic diagram of a further embodiment of a circuit board 44' of a locator beacon 10' of the immediate invention. In the further preferred embodiment, beacon 10' includes all the components of circuit board 44 described in reference to FIG. 4 and further includes four directional antennae 80. One directional antenna 80 located in each of the cardinal points on circuit board 44'. Exemplarily, top antenna 80T is positioned in the north, bottom antenna 80B is positioned in the south, right antenna 80R is positioned in the east and left antenna 80L is positioned in the west. Of course these reference names and locations are only exemplary and could be substituted for other names in other positions. Each antenna transmits a different MAC address or ID, so that the phone/application can calculate which Mac Address had the highest RSSI value. The phone will then know if it is up, down, left or right relative to the Sticker.

In some embodiments which include a plurality of directional antennae (i.e. two or more antennae), top cover 40 further includes an indicator mark indicating how the sticker should be orientated. If the orientation of the beacon is known then the positions of the directional antennae 80 are known, allowing the phone to know in which direction the beacon is located (as mentioned in the previous embodiment).

In further embodiments, the application can process the distance and/or direction using various combinations of RSSI values from sticker and/or the phone, as discussed above in relation to the distance function.

In a case where a given sticker is located near a number of other stickers, it may be possible for the mobile application on the phone to triangulate the position of the given sticker.

In other embodiments, signal strength and phase information are analyzed and processed using various techniques. Analyzing and processing phase measurements (MIMO, BeamForming) improve accuracy of detecting both distance and direction. That is to say that phase control improves control over directional transmissions making the transmission is a desired direction more accurate. Coupling this technology with the aforementioned idea of transmitting multiple MAC/ID information increases the directional accuracy of the scanning feature.

In an embodiment of the invention including two or more antennas, phase measurements can be used to improve accuracy of both distance and direction.

In receive mode, by measuring the complex amplitude of the signals (amplitude and phase), and knowing the individual antenna characteristics (gain, coupling, directionality), it is possible to deduce directional information (angle of arrival, AOA).

In transmit mode, by individually controlling the amplitude, phase or both of the transmitted signal for each individual antenna, the directional characteristics of the combined antennas (array) can be modified. Such manipulation allows for transmitting different packets in different directions, thereby enabling a non directional receiver to know its angle relative to the array.

The control of the signal can be implemented by phase shifters, gain control blocks, complex modulators, in the RF path, or by using a chipset with MIMO capabilities to control the same at the baseband level.

An additional method for detecting indoor location is to use an array of non directional beacons, each having one antenna. The beacons are time synchronized, for example by using a reference transmitter with a known distance/RF path delay to each of the units. Then, when receiving a signal from a source device that needs to be located, each unit measures the individual time of arrival of that signal at the unit. As the units are time synchronized, the time-of-arrival data can be translated into pseudo range data (similar to GPS). When at least four beacons receive the signal the information can be used to calculate the 3D location of the source transmitter.

Handling Multiple Beacons on a Single Mobile Device

The innovative application can manage multiple Stick-n-Find beacons 10 simultaneously. A definitive upper limit is not set by the mobile application, although beyond a certain number (e.g. twenty), the screen becomes too cluttered to be effectual. The number of beacons that can be managed can vary depending on the platform hosting the application. The application can locate all of the beacons at the same time.

Luggage Tag

People that have just landed after commercial air travel must wait near a moving conveyor belt and concentrate to avoid missing their checked luggage as it passes by them, potentially costing them valuable time. In other cases, large families with small children and many pieces of luggage usually find it difficult to keep track of children and luggage resulting in one of the two going missing. It would be better if the passengers could sit comfortably (especially with tired and irritable children and parents) and be notified on their smart phones when their luggage has come into range, so that they can then get up and retrieve their luggage in a more time-efficient and convenient manner. Furthermore, as many bags look alike, people often use custom ribbons and other identifiers to visibly mark their bags in order to quickly identify their luggage as it passes by on the conveyor belt. Lastly, when multiple pieces of luggage have to be collected, one or more of the pieces of luggage can go missing, or more commonly, get forgotten on the belt.

It would be relatively easy to track the luggage and receive a notification on a smart phone with a Bluetooth-enabled locator sticker detailed above. One problem that is not solved by the aforementioned product is that Bluetooth communications are not always allowed on commercial airplanes.

It would be therefore be highly advantageous to have a device and method for placing a Bluetooth or other wireless tracking device in an "airplane mode" (i.e. a state in which the device does not transmit a Bluetooth or other wireless signal) during the course of the flight and reactivate the transmitter when the plane has landed. Such an arrangement, among other things, would also serve to save battery life.

It is herein proposed that the Luggage Tag of the immediate invention must be able to detect that it is being loaded into an airplane and therefore turn off the Bluetooth Transmission signal. Furthermore, the device must be able to detect when the airplane has landed and that it is safe to resume Bluetooth transmission. Once it has been determined that it is safe to reactivate the Bluetooth signal, the device must be able to turn the Bluetooth signal back on so that the passenger waiting by the conveyor belt can detect the bag for retrieval.

The exemplary device referred to herein, solely for the purpose of providing an enabling embodiment of the invention, but not intending to be limiting, is a Bluetooth Low Energy proximity/tracking tag, which is either built into the suitcase/luggage, or attached externally, such as in the form of a Luggage Tag which is a modified Locator Beacon.

The proposed solution involves detecting that the luggage has begun a flight, and ended a flight, using electronic sensors in the luggage tag.

Detecting Beginning of Flight and Deactivating Bluetooth

One proposed method for detecting when the Bluetooth transmitter must be turned off relies on the fact that every piece of luggage undergoes X-Ray inspection (this is true for most international and many national airports). A fast PIN photodiode shielded from RF and visible light is integrated or coupled to the tag. Once an X-Ray beam hits the MN photodiode, it sends a voltage signal to the processor of the luggage tag, indicating that the bag is in the process of being loaded into an airplane. Upon receiving the signal, the processor is configured to suspend all Local Area Wireless communication (LAWC) transmissions (see DEFINITIONS). At this point the processor turns off any Bluetooth transmissions.

Another proposed method is to use a light detector located inside the luggage tag. Once the bags are loaded into the hold of the airplane, there is complete darkness. Exemplarily, a 20 minute timer measuring this darkness triggers the processor to shut down any Bluetooth transmissions.

Detecting End of Flight and Reactivating Bluetooth

One exemplary method involves the luggage tag monitoring for any Bluetooth or WiFi signals. Since both Bluetooth and WiFi use the same 2.4 GHz ISM band, the luggage tag scans this spectrum. If there are no signals, the tracker tag knows that it is (still) in the cargo hold (as Bluetooth and WiFi must be disabled before a flight begins). Even if there are signals in the baggage hold, the distance from the tag to the source of the signal will be constant (e.g. if another piece of luggage contains a device emitting a Bluetooth signal, the distance between the tag and the signal source will remain constant once both pieces of baggage have been placed in the hold). The approximate distance of the signal source to the tag can be measured based on Received Signal Strength Indicator (RSSI) of the signal. If the RSSI of the signal remains relatively constant, then the signal source is in the same place and can be disregarded. Once the luggage tag is removed from the hold, more Bluetooth and WiFi signals (at changing distances) will be detected, indicating that the tracker tag is now in an area where it is safe to resume transmitting wireless signals again. Potentially, the aforementioned method can also be used in the same manner to determine when to deactivate the Bluetooth signal in the first place.

Mobile App Function

By using RSSI Bluetooth values from the phone or from the luggage tag, the Tag App (the software application installed on the mobile device, such as a smartphone, tracking the tag) can approximate the distance between the phone and the piece of luggage (see above). The app alerts the user once the luggage is within range. When the user receives the alert he can approach the conveyer belt to retrieve his luggage.

Figure 8A:
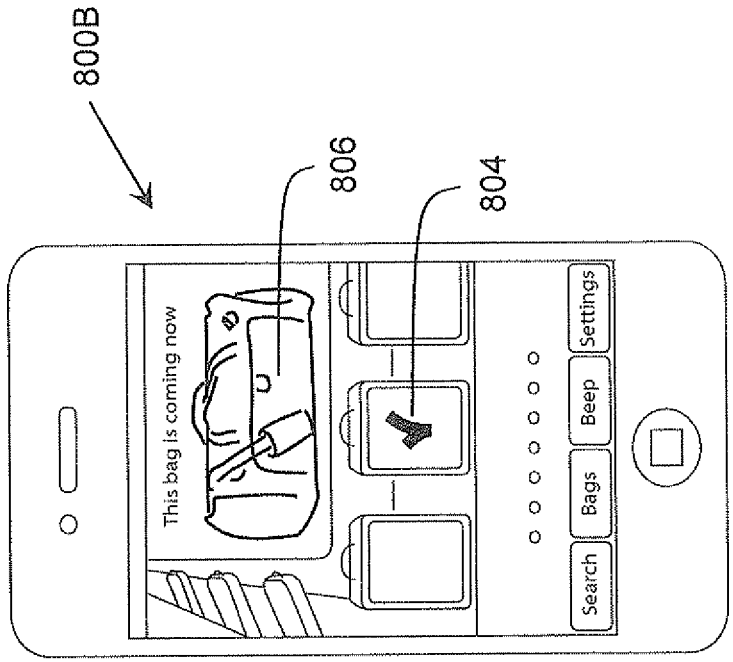
FIG. 8A/B are screen shots of a smart phone running a Luggage Tag mobile application ("Tag App")
Figure 8B:
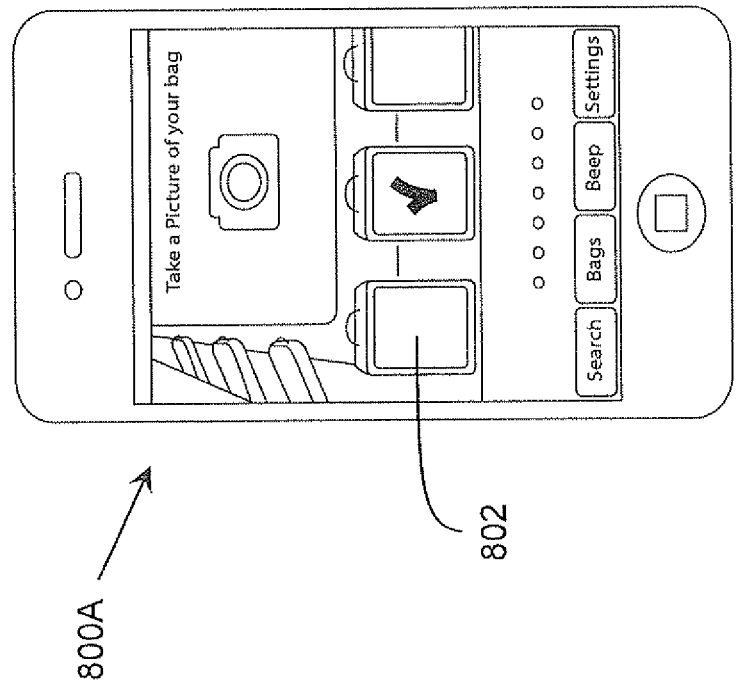

Referring now to FIGS. 8A and 8B, there are depicted screen shots 800A/800B of the innovative Tag App. In one preferred embodiment of the Tag App, carousel or conveyor belt with suitcases passing by is displayed on the mobile phone. In the depicted embodiment, animated figures of luggage 802 are presented. In an alternative embodiment, the app shows real images of suitcases. The App alerts the user that the bag is coming closer in any appropriate manner. For example, the app displays the detected piece of luggage as a brightly colored bag and/or with a big check-mark 804 as depicted in FIG. 8B. The app can approximate the distance between the phone and the bag based on the RSSI values and or as described above with reference to the Locator Beacon. In another embodiment, the app activates the integrated camera on the mobile phone and the user is instructed to direct the camera towards the approaching luggage. The app then 'paints' the tagged luggage in the display, using imaging processing and augmented reality methods. The correct piece of baggage is identified based on a calculation of the distance between the two devices or using some other line-of-sight detection method.

In another exemplary embodiment, the app displays a red or any other distinctive piece of luggage on the screen, illustrating to the user that the bag is about to appear. Once the suitcase is very close, the app displays a red or any other color or distinctive suitcase, alerting the user that the suitcase is very near by, or even right in front of him.

In some embodiments, the app further allows the user to take a picture of the suitcase or suitcases (as the app can be paired with many Tags). An image 806 of the suitcase is displayed on the screen when the user is waiting for the luggage (e.g. see FIG. 8B). The image may change color or grow larger (or any other effect) as the bag comes closer.

The user can select multiple suitcases or tags to track and get notification. User can slide between the images of the suitcases on the display to see if anyone is near. Once a suitcase is getting near, the app displays the image of the suitcase that is approaching.

EXAMPLE

In FIG. 8A the exemplary screen shot 800A of the Tag App, depicts a user interface that instructs the user to take a picture of the bag which has a corresponding tracker tag. The image is stored and logically related to the uniquely identifiable tracker tag attached to—or embedded in—the bag. For example, the tag can include an identification barcode printed on the tag. The barcode includes the Unique ID of the specific tag, such as a MAC ID of the Bluetooth tracker tag. After taking the picture, the user is instructed to scan the barcode with a scanning feature of the app. Once scanned, the image is related to the tag based on the scanned MAC ID.

FIG. 8B illustrates exemplary screen shot 800B of the Tag App Retrieval Feature. In the Figure, the screen displays the image of the bag 806 (taken as described above) and an animation of bags 802 on a conveyer belt where one of the bags is 'painted' or highlighted 804 (in this case it is displayed with a prominent check-mark). The approximate location of the actual bag is illustratively displayed on the screen, indicating to the user that the bag is approaching and approximately how near the bag is.

Occupancy Sensor Unit

Figure 9:
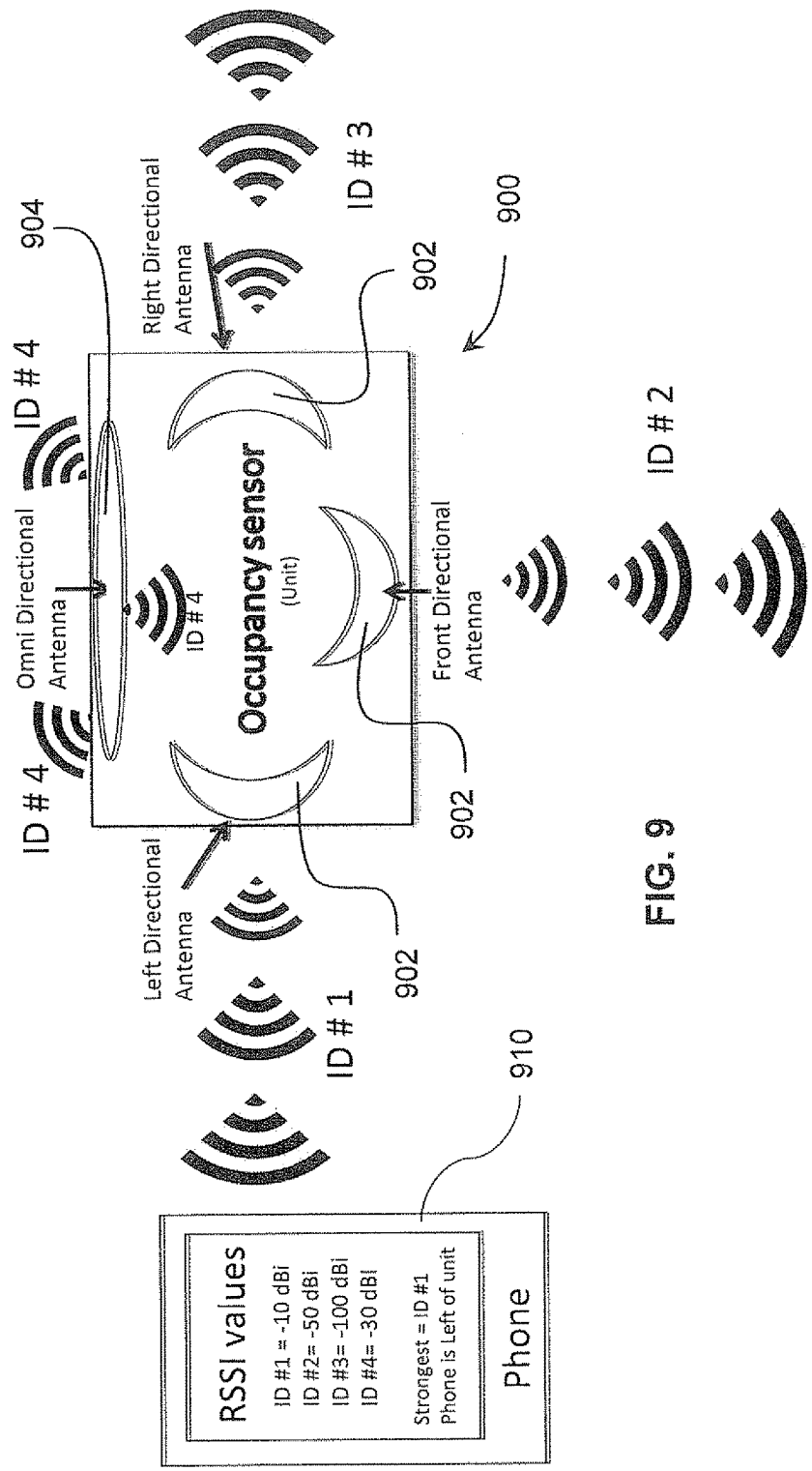
FIG. 9 is a block diagram for BLE occupancy sensor without WiFi, in communication with an exemplary MCD.

Referring now to FIGS. 9-12, there are provided herein various embodiments of an Occupancy Sensor Unit (OSU), which is a static unit that interfaces with one or more mobile devices such as mobile phones. Where applicable, the same reference numbers have been used referring to similar components in FIGS. 9-12. FIG. 9 depicts a block diagram of a BLE occupancy sensor, without WiFi, in communication with an exemplary MCD. For the sake of clarity, Wi-Fi is generally regarded as any wireless local area network (WLAN) products that are based on the Institute of Electrical and Electronics Engineers' (IEEE) 802.11 standards. In the immediate embodiment of the invention, the occupancy sensor unit 900 is about the size of a small mobile phone wall charger. In one embodiment of the invention, the unit plugs to a power outlet (AC) in the wall, and is both powered by the outlet and held in place by the face plate. In an alternative embodiment, the sensor is a sticker or stand-alone beacon with built in batteries.

OSU 900 has a wireless transceiver (not shown) with 4 antennas connected via a switch (not shown) to the transceiver Module/chip (not shown). Preferably the wireless technology is Bluetooth. More preferably the technology is BLE. In some embodiments, other close-proximity wireless technologies (e.g. NFC, RFID etc.) are used, but not WiFi. Three of the antennas are Directional antennas 902. Each of the Directional antennas points in a different direction. One antenna points to the left of the unit, one to the right of the unit, and one to the front on the unit. In one embodiment, the directional antenna is a simple wire with a reflector behind it, making it a directional antenna. Preferably the antennae are also located closer to the side of the unit to which they point (i.e. left pointing antenna located on the left-hand side of the unit, right pointing antenna located on the right-hand side etc.). The fourth antenna is an Omni Directional Antenna 904.

Figure 10:
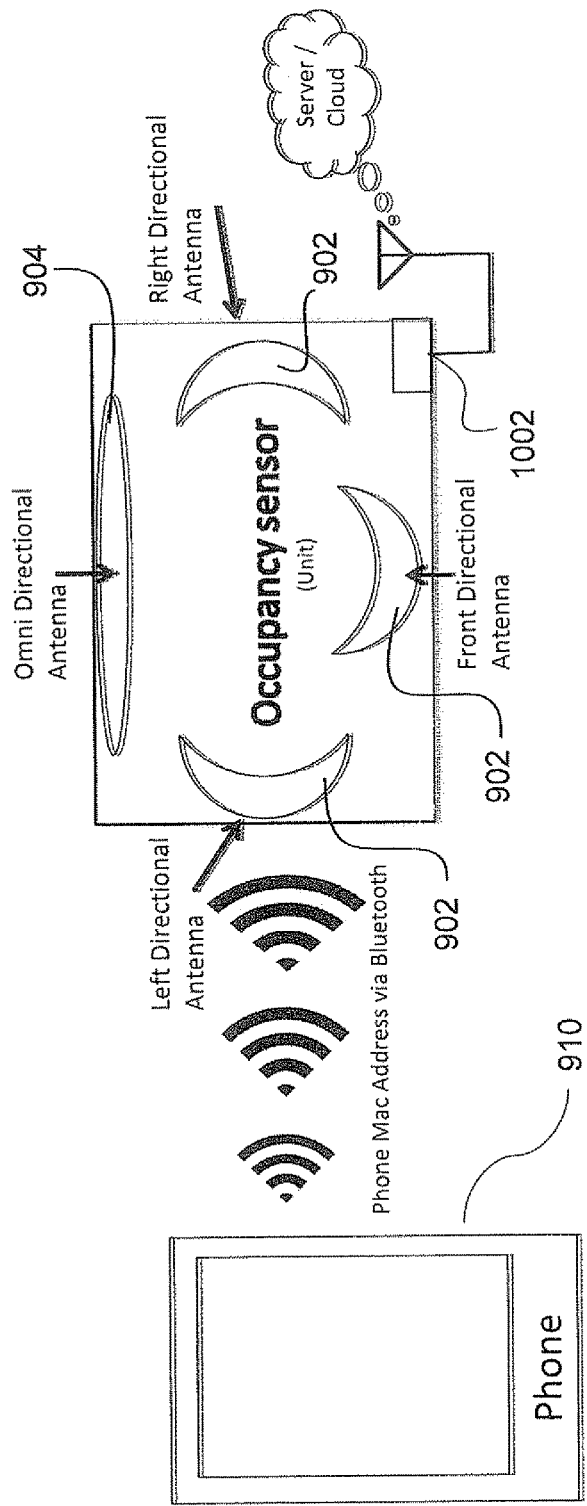
FIG. 10 is a diagram for BLE occupancy sensor with WiFi and/or Cellular Data Modem.

FIG. 10 depicts a diagram for second embodiment of the BLE occupancy sensor 1000, where the sensor further includes a WiFi module (including a transceiver and antenna based on IEEE 802.11 standards) and/or Cellular Data Modem. In the second embodiment of the invention, the unit includes a Wifi module with its own antenna 1002. In a further alternative embodiment, the Wifi module shares its antenna with the Bluetooth Omni directional Antenna 904.

The Wifi Module connects to the local Wifi router, and from there to a cloud server or LAN server. In further embodiments, the unit additionally or alternatively includes a cellular modem which is used to connect to the cloud in areas where there is no Wifi router or signal.

Example of Use Cases/BT Beacon-OSU (No Wifi)

Many BT Beacons are placed in a Super-Market. A mobile device, such as a smart phone 910, runs the Supermarket's mobile application (app). User inputs a Shopping list in the application. The app is programmed with the map of the store and where each beacon is located. Potentially, the map/locations can be updated on the app via a Wifi connection to the Super-Market server or via cellular modem from a cloud server—each time the app is run.

The app directs the phone to scan for the beacons and receives information on the detected locations of the beacons. By getting the proper information regarding which beacon ID is the strongest signal, the app can determine the Phone's location in the supermarket, and guide/help the shopper, where to go etc. (See FIG. 10)

Potentially, the supper market server (or cloud server) could push notifications to the app related to different areas in the store, e.g. a coupon for the milk, when management knows they have too much milk in inventory. Any user with a phone running the app would get the coupon when standing in front of the milk.

Example #1 Case of Wifi Bluetooth Bridge OSU

Figure 11:
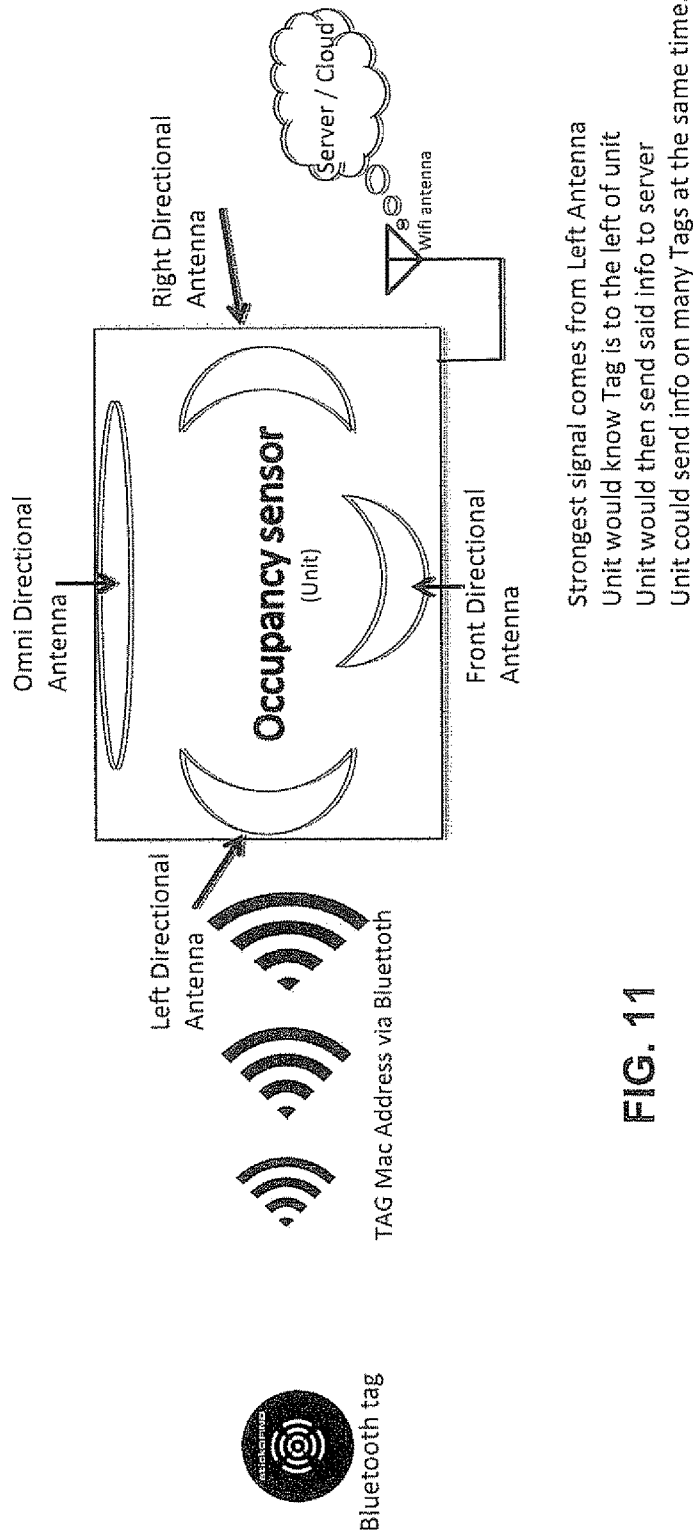
FIG. 11 is a diagram for BLE occupancy sensor with WiFi and/or Cellular Data Modem with a Locator Tag.

FIG. 11 depicts the OSU of FIG. 10 in wireless communication with a Locator Tag of FIG. 1A. In an exemplary scenario such as a hospital, every cart, portable X-ray machine, Ultrasound machine etc., can be tagged with a Bluetooth Tag. Likewise, Doctors themselves can also carry these tags, or run a Hospital Mobile Application (App) on personal mobile phones (see FIG. 10). The occupancy sensor connects to the hospital server via the Wifi module.

By putting enough occupancy sensors around the hospital complex, a server can almost always know where each item is located, down to Floor level and room. Any employee of the Hospital would be able to find immediately anything tagged with his smart-phone, tablet or PC. Likewise, a doctor could be easily located, obviating the need to continually page the doctor (as seen in the movies).

To further reduce costs, a Mesh Network of units, as illustrated in FIG. 12, can be set up in the complex. FIG. 12 depicts a network of OSU spaced within LAWC proximity of each other, thereby creating a mesh network. In the mesh network, only unit 6 is WiFi enabled (or includes a cellular modem) and the regular occupancy sensor units communicate with each other (i.e. transmitting data from one OSU to second OSU, closer to the WiFi enabled OSU), as depicted in the diagram, until the WiFi enabled unit receives the necessary information which is then relayed to the server or cloud.

In another embodiment of this solution, the devices or phones detect the beacons and send the detected beacon information to the server, so a Wifi unit is not needed.

Example #2 Case of Wifi Bluetooth Bridge Occupancy Sensor Unit

An OSU is installed at the entrance of an office. Every employee gets a Bluetooth Tag, or runs the Company's App on their smart phone. When employees come in, the OSU detects the direction in which the employee is moving and sends that information to the server. When the Server receives the directional information, it calculates (or the beacon itself does the calculation) whether the Employee came in or left and logs this information. By placing more sensors around an office, it would be easy to locate employees, and know where they went and when.

Earth Coordinates

In some embodiments, especially for static Tags (but not only), Earth Coordinates are used as part of a master Unique User Identification (UUID) of the Tag. At least two advantages are gained by enabling the coordinates to be part of UUID or associating the tag ID in the server with its Earth Coordinates:

(i) Indoors, where there is no GPS, the phone will know immediately its exact coordinates. This means that apps or advertisements like Google maps, Google ads, or even Groupon or Facebook ads, will know the exact position of the mobile phone, even indoors. This is an improvement over the current method of use Cell tower triangulation, which has an accuracy of about one square mile.

(ii) Using Coordinates as part of the UUID, or by storing the coordinates on a server and associating them with the Beacon ID/UUID, helps avoid spoofing or hacking of beacons, by comparing the coordinates and actual cellphone triangulation area. If they match, it means the beacon is approximately in the right area.

So, for example, a beacon that is placed in NYC, the UUID could start with 406700739400 given than the GPS coordinates of the exact pinpoint UUID in NYC is 40.6700° N, 73.9400° W Another solution is to match UUID with Coordinates and save the coordinates on a server, so that when a phone is in the area, the UUID or MAC address is associated with Coordinates online. Saving the coordinates online, allows verification of proper coordinates, which uses less power on the sticker side, and can be very easily adjusted in case of errors.

Encryption Based Beacon

In order to avoid spoofing of beacons, the beacons can be encrypted so that the mobile app on the phone can authenticate a beacon and know that the broadcast signal is coming from a real beacon/Tag.

Today, with a simple app on iOS or Android mobile platforms, two phones can be deployed in separate stores. One phone listens to a beacon, in store A, and sends that beacon information over cellular data to the other phone in store B. The phone in store B takes that data, and transmits it from within the phone, pretending to be the actual beacon in store A.

Therefore at least the following two methods of encryption are included in the specification of the beacon:

(i) Connect and authenticate: The beacon connects to a phone without pairing and only exchanges encryption keys. The problem with this is that connection can take some seconds. If a beacon runs at 100 ms intervals, it could take less than 1 second for a connection to be made that will last about 1-2 seconds. This would be acceptable, but will require beacons with larger batteries.

(ii) Periodic UUID Change:

Each beacon would get a unique ID. By placing a barcode with a unique ID, or programming the Beacon with a unique ID. Each beacon would have a timer that would start counting once the battery is inserted. Each beacon runs an internal clock, and will change the UUID based on a predefined time delta or specified time (e.g. daily at 2:25 am).

When provisioning a Beacon, the provisioning app would read the barcode unique ID, or get the Unique ID from the Beacon, It would also get the Beacon's timer time. The app would then connect to the provisioning server, and register the unique ID and corresponding timer running time. The server would then assign a private key to that beacon. The app would then program the beacon with the unique private key. Beacon will then hash the Timer time with the private key and unique ID. This would create an ID that is constantly changing based on the time. The server on the cloud will know the correct UUID, key, and can authenticate the beacon. If the internal clock of a beacon is not to be exact, a mesh network (see FIG. 12) is required to keep all beacons synchronized. This mesh can be managed by a Master Beacon with long range (see below). It is possible to transmit the Hashed ID from the beacon, and partial ID not encrypted. This will allow the server to faster decrypt the ID.

By syncing the exact time of the advertisement transmission, in between beacons, a moving target's (Human walking) phone will know much more accurate its position and walking direction. When there is no known synchronization of packets, a human walking at 1.3 meters per second, with interval transmission in the beacons of 100 ins, each second will get 10 packets from all beacons in area. But if the 10 per second (each lasting 1 ms) come in all at a synchronized exact time, the phone can calculate in exact milliseconds, the speed of the adult, and know much better his position.

In order to synchronize the beacons, a master beacon must be present telling each beacon, its time slot of TX, and notifying that to the cloud server, so that the apps will know it.

Saving Power on the Phone.

In some embodiments, the phone scanning intervals change based on location, and actual beacons present. An indoor location beacon would have special characteristics like UUID containing the actual Coordinates. When a phone does not detect indoor location beacons, the scanning rate falls back to a very conservative regimen, for example: 5 second scan, 1 minute rest; or 10 second scan, 2 minute rest.

But when the phone detects an indoor beacon, (i.e. entering a store, the mall, supermarket, restaurant etc., the phone scales up the scanning regimen and uses more battery. With the assumption that an average human would "shop" at the above shopping locations (where Beacons are installed) at an average of 2 hours per day, ramping up the battery to scan 10 seconds, sleep 20 seconds, would use more battery, but will not drain the battery.

Each beacon can also differentiate between a beacon and a phone. When a beacon does not detect any nearby phones, the processing unit lowers its TX ad intervals to about every 10-15 seconds (for example) in order to conserve battery.

Since each beacon can 'talk' with each other beacon in range and the units are preferably synchronized, one potential embodiment of the system includes each beacon 'telling' the other beacon/s if other phones/devices are detected nearby. Once a phone/device is seen nearby, it wakes-up the system using the mesh network, and each beacon then ramps up its TX ad intervals.

In a preferred embodiment, the beacon can be programmed behave differently during working hours and non working hours, in order to shut down during non working hours and thereby conserve.

Another solution for saving power on the phone, is to create Geofencing in an app or part of the OS. By creating a geofence around a store, once the phone is in the area of this store, the BT Scan of the phone can be increased, so needing a master beacon to trigger the other beacons can be avoided.

With Mesh networking between beacons, every x seconds, the beacons communicate between each other at a designated time slot to synchronize each other. Between regular Ad broadcast packets, the sticker sends a sync packet to all stickers in area. This sync packet contains the exact time, and the sync time slot, so any other Sticker will not re-broadcast at the same time the Sync packet.

Exemplarily each sync packet further contains information such as:
1. Exact time.
2. Individual Sync packet time to TX for that sticker.
3. Number of visible BLE devices in area (Phones etc present in room)
4. Call for firmware update, at a special time, and sub carrier for the actual firmware.
5. Encryption keys
6. Time of business, and timer for different advertisement packets interval setting/changes.
7. Timeslot of individual advertisement packet. This means that system knows the time slot for each Beacon.
8. Support for a special beacon with outside connection to keep system time synced.

A master beacon can be added to this system. The master beacon has an accurate clock, using very exact Crystals or placing this beacon near a window with OPS. Using UPS, the Beacon can get a very accurate time. The master beacon, can communicate with all stickers in the area in daisy chain scheme or communicating directly with all beacons in the area, using a 20 dB amplifier on the BT line output, and a high gain BT Antenna, and keep the beacons in exact sync and with accurate time.

The Master beacon can also connect to the Internet via Wifi or Cellular data, and get Sync information from a cloud server, including Authentication and Encryption keys. In further embodiments, the master Beacon can serve as a gateway to the Internet, in order to retrieve firmware updates, and receive other information to be passed to the other beacons and/or send diagnostic information to the server.

RSSI Distance Estimator:

We can calculate the approximate distance between a beacon and a phone, based on Calibration and matching RSSI with a real distance. But because this is based on Signal quality, holding the phone differently or people/items blocking the signal, can interfere, and modify the signal, making it look better or worse. In order to better gauge distance, an algorithm is run to see if the RSSI signal is getting stronger or weaker. If the delta is fixed, meaning that say, if the signal is getting stronger in a steady manner, that this steady manner matches a person getting closer to the sticker at a fixed speed, the sticker can predict where the person will be in xx seconds, and according to that estimation, push a new notification or modify the contents of its packet to activate an event at the phone. This feature can also be at the phone library.

Proposed Device Library (Handset Features for Scanning)

Geofencing around hot areas: By creating a geofence around a hot area, within the app or OS on the handset, the phone is caused to scan for BLE devices at a faster rate when located within the Geofence. This means that say, if an app has a geofence around the shopping mall, once a user is near or entering this geofence around the shopping mall, the BLE scanner inside the phone will scan for longer times, whereas when the phone is outside this geofence, will scan for less time, and put the BLE to sleep for longer times in between scans.

Adaptive scanning: If while scanning, the Handset device sees a BLE with any known Beacon protocol (e.g. iBeacon, SNF beacon etc) it will start scanning faster and longer. This will enable battery conservation. When a user is in a store, and the phone sees a beacon, the phone will scan faster and longer. Once user exist the area, and the phone no longer detects any known. Beacons, the phone will scale down the scanning regimen.

Special beacon trigger: if Handset device sees a special sticker with custom QUID or a special ad packet, this will trigger the Handset device to start scanning faster, as long as this sticker is visible. When sticker is not visible, it will scale down, and scan shorter and intervals will be longer in between scans.

Server Support for Lost Tags

A user that registers the app with the Lost Sticker Server (LSS) and receives an encrypted key, stored at the server. When a phone connects via a secure encrypted Bluetooth link, the phone takes this key, and sends it to the server. The server keeps both keys. Exemplarily, to be able to track, or get Sticker information from the server, the user is required to perform a login procedure, in order to, e.g., display the last known position of the lost tag.

In another embodiment, a phone running the application and scanning Bluetooth channels that detects a tag that does not 'belong' to the phone sends the Sticker UUID to the server, with a time stamp, and phone location, based on GPS, or Cellular triangulation.

Only the owner of the Sticker will be able to see the position of the sticker.

So, if one user loses a sticker and another phone 'finds' that Sticker (via Bluetooth), the app on the finding phone will automatically (and without the knowledge of the owner of the finding phone) send the lost sticker's information to the server. The owner of the lost sticker will receive a notification from the server that the sticker has been found.

A further feature is a Lost Sticker Alert feature. A user need only select a sticker that is lost from within the app, or via login server, and once that sticker is detected by any phone running the app, the user will get a notification.

Personal Item Geofencing.

The app feature allows the user to select items that he usually carries around with him all day long. The phone detects the personal item, and sends its position to server as always and as explained above. In addition, the phone also sends its own position to server.

If the user leaves an area, and the server registers that the phone is in a new location outside of the previous geofence, but the sticker is not together with the phone, the server sends an alert notifying the user that a personal item has been left behind.

Additional information on how the actual encryption and server works is:

Every sticker has a unique ID which is a combination of a unique MAC address and a UUID. When the app connects to a sticker, it can read an encrypted version of the sticker ID. For the user to be able to track a certain sticker he/she has to login to his/her account, connect to a sticker, then register or bind the sticker to his account. The sticker binding or registering procedure consists of the following procedure:

An ID packet is read from the sticker. The ID packet consist of the sticker unique ID, eight security check bytes, and two integers representing the number of times the sticker revealed its unique ID and the number of times the sticker rebooted respectively. The whole packet is encrypted using a two layer encryption using a hardcoded key then using the first and the second half of the packet itself. The procedure makes sure to embed the packet id itself along with the hardcoded key in generating the 8 security bytes.

The ID packet is sent as is to the server. The server will decrypt it to validate that the packet was generated by a StickNFind sticker, then will extract the ID Reads Counter and the sticker Startups Counter from the decrypted ID packet. The last two counters are used to prevent reusing a captured packet to make an authorized sticker registration.

After the ID packet is verified, the server generates a unique 24 byte key and responds to the application with this key. The application then writes this key to the sticker. When the writing process is done successfully, the sticker will start sending special beacon packets. Each beacon packet consists of the previously specified key along with the sticker startup counter and the number of beacon packets of this type that were generated by the sticker. The whole packet is encrypted using the first 16 bytes of the specified key.

Whenever the app encounters one of the specified beacon packets, it sends the whole packet to the server. The server then searches for the corresponding sticker by searching among the saved keys that can decrypt the received packet and preserve the specifications of the expected decrypted packet. The sticker startup field and the beacon packet counter are used to prevent reusing of a previously used beacon packet in order to prevent fake reporting of a sticker location.

Server stores Sticknfind Sticker Encyption keys and names: When a user pairs a new sticker with his phone, instead of saving the paring keys locally on the phone, the app saves it on the cloud, associating the UUID of the Sticker with the username/password and its encryption keys. Further the server can also associate with this UUID the selected name the user gave it, i.e. keys etc.

Because people tend to change mobile phones very often, user logging in with his credentials, will allow a new phone to identify the sticker name from within scanning range, and pair it with the phone, by downloading the necessary Encryption keys to pair the Sticker with the phone.

Security Protection:

A proximity-based pairing feature is employed to ensure that other people will not pair with your existing sticker to track the owner of the user, or get alerts when the owner is nearby. This means that a user must be within one foot of the Sticker in order to pair with it. Therefore if a second party wants to pair with a user's sticker (in order to track or get alerts when the user is nearby) from more that one foot away, the firmware inside the sticker will not allow the pairing. Only a user within one foot proximity will be allowed to pair with the sticker.

Sleeping Mode/Shipping Mode:

Because the sticker uses a piezoelectric audio amplifier as a buzzer, the stickers are shipped with the Radio off, in order to save battery.

When the user wants to 'wake up' the stickers to start using them, they need to tap the sticker 2 times, and the taping will create a signal from the piezoelectric component, causing the CPU to wake up and turn on the radio.

The piezoelectric component is also used to find a paired phone. If the phone is lost/misplaced, the user need only tap the sticker 3 times. This action changes the broadcast packets to an ALERT packet that the app or services running in the background of the phone sees. The broadcast packet causes the phone ringer to ring.

When installing a proximity beacon (OSU) in an area such as in a retail store for example, the beacon is placed is a specific area for a number of reasons. For example the OSU can be used to monitor consumer statistics, dwelling time (time looking at products), to serve offers or have the phone store the information for later use, etc. The information is relayed to the merchant for analysis (e.g. success/failure of an advertisement to catch the interest of passing shoppers and subsequent success/failure at achieving a conversion by cross referencing user data and till slips data etc.) and future coupons etc.

To this end, the beacons must be placed in the right areas, near the products or areas of interest. A problem that can occur is that a store manager, cleaner, packer, etc., might move a fixture and thus moving a beacon to a different area, and therefore the monitoring and coupon pushing will be incorrect or less effective.

In one preferred solution, each beacon "learns" neighboring beacons so that if a neighboring beacon goes missing or is moved, the first beacon will send a report about the missing beacon in part of a regular/special data packet that will be relayed to the server. Conversely, when a beacon notices that all of the neighboring beacons are now different, the beacon will send a report to the server notifying the server that the beacon has been moved. The server can then provision the new beacon or send a notification for new provisioning.

If a new beacon is installed and the detected neighboring beacons match the beacons previously known by the now-missing/misplaced beacon, then the server can assume that the new beacon has replaced the older one.

Beacons can 'listen' to each other using a Synchronized mesh network. They can adapt each other and synchronize with each other based on time slots automatically created by each beacon.

A very precise clock is needed to keep the networked beacons of the system in sync. When the system does not include a master beacon, then an accurate clock reading can be sent from the server via an End-user phone connection.

Method for Saving Battery on Beacons

Bluetooth Beacons consume more power when receiving rather than when transmitting. A way to reduce consumption is that if a beacon and a phone are far away:
  a. Beacon sends an advertisement packet.
  b. Remote phone scans and replies with a scan request.
  c. Beacon measures signal RSSI, and if signal below certain predefined level then the phone is determined to be too far away, and the beacon will ignore the phone. (The beacon will not Listen for the reply of the Phone, that can take 50 micro seconds, but rather just listen for RSSI check after the phone replies that only takes 8 micro seconds.)
  d. If the phone is closer, the beacon will switch from RSSI RX to full Packet receiving mode.

Shop Tag

Figure 13:
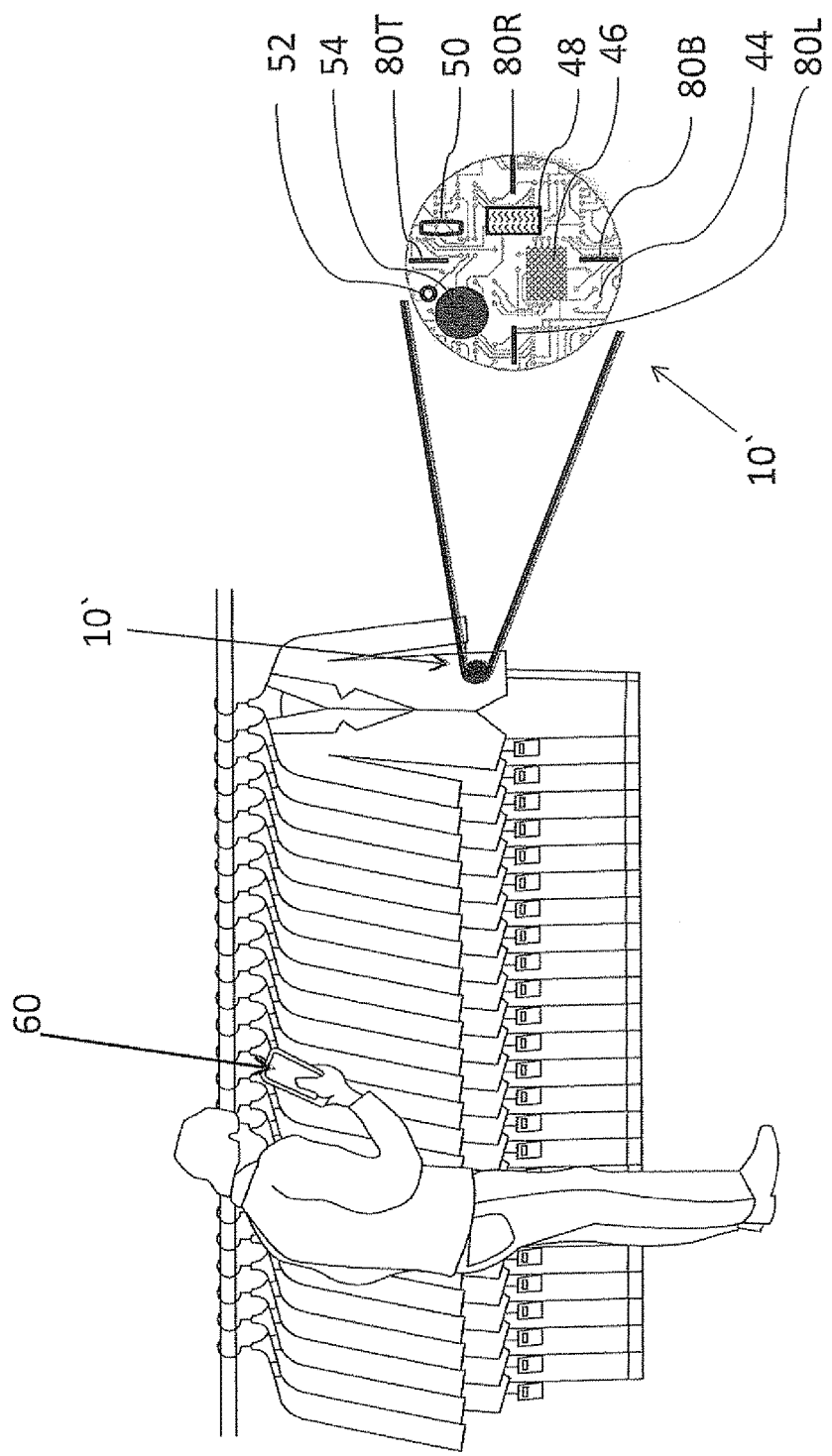
FIG. 13 is an exemplary pictorial depiction of a BLE Tag in use in an exemplary scenario.

FIG. 13 is an exemplary pictorial depiction of a BLE Tag in use in an exemplary scenario. In the exemplary scenario, a BLE Tag is employed as part of a system for store management. The information on the tag can be accessed by mobile computing and communications platforms/devices such as smartphones and the like running a complementary application. An innovative Shop Tag can be tracked (e.g. for inventory purposes and the like) by a BLE (or other LAWC) enabled computing device as part of a larger system (e.g. an in-store inventory and sales system).

In-store inventory and tracking of clothes using RFID as an easy method of identifying and tracking goods is known in the art. On the other hand, RFID is a limited technology, with respect to both logistic, physical limitations as well as technology limitations. RFID tags are ubiquitous in the work place as ID tags used for accessing workplaces as well as in warehouses and the like for purposes of tracking. In both general cases, RFID is limited to a maximum of about one meter, beyond which the tags cannot be read/accessed. Furthermore, specified, expensive devices are needed for reading RFID tags. The technology for Mobile RFID (M-RFID) does not enjoy widespread use and is not available on the majority of mobile devices. The immediate innovation discloses a Bluetooth Shop Tag which adds to the existing in-store RFID clothes hard tag. Preferably the Bluetooth Tag uses BLE technology (BLE Tag) for increased functionality. Combing both Hardtag and BLE solution allows to keep existing infrastructure of HardTags and door sensors, while adding a new level of inventory management for the store, get customer behavior and dwelling time, while supplying the customer with e better shopping experience.

Using Bluetooth Low Energy technology, each item in a store gets an individual ID, and information about the item is stored on the Tag. The Tag also provides an easy means for securing items to prevent shoplifting. For example, if an item is taken from the store, the alarm at the door will sound. The Tag assists in managing inventory as each tag can be sensed by the management system automatically. Bluetooth Low Energy also allows for managing inventory over an area of approximately one hundred feet. Any computing device which is BLE enabled, can know at any given time, the inventory status. The up-to-date inventory information is then readily available on the system server and/or in the cloud/on the Web.

Furthermore, as depicted in FIG. 13, the Tag can be accessed by shoppers to provide further information. A user mobile application (app) is downloaded by the shopper for use in the store. Most modern phones are BLE enabled, allowing shoppers to find specific items, and know if the store is carrying their specific size, color, etc.

For example, a clothes store carries various items of clothing, some of which are on display, some in storage and some in sister stores of the same chain. For example, a particular dress may be available in three colors and six sizes in a given store; the same dress in a forth color or seventh size may be in storage or only available in a sister store.

A shopper can get clothing information, by just being close to the item, using the Proximity detection feature. The app can search and see if the store has the item in the user's size, and the app helps the user find the right size or color using the proximity feature. The app can either access the system server or the cloud (either or both contain the inventory data as discussed above). Therefore, when a user is searching for an item in the store, they can also know if the item is available, currently, at another store.

According to the present invention there is provided a coin sized Shop Tag 10' using Bluetooth or Bluetooth Low Energy communication coupled with a mobile application for a smartphone/Tablet computer/Laptop/and any other handheld or mobile computing device 60. The application offers various features including: a Proximity feature including a radar screen for determining distance between device and Tag and a Find It feature which sounds an alarm when a selected Tag comes into range. Each article of clothing is labeled with a Shop Tag 10' with a MAD. A user can scan and see live inventory, including color and size of the desired items, directly on the phone. When looking for a particular size/color/brand or other article of clothing the user can select the desired article on the mobile app and the phone will indicate where the article is. The corresponding Tag can start flashing or buzzing when the mobile device is in close proximity to the selected article. The directional antenna give the Radar Screen function directionality, not only distance. The user mobile app communicates with the management system server via WiFi and with the chain store cloud via cellular/data modem. Of course alternative configurations of the system are possible.

The present invention discloses an innovative BLE Jag that has a communicating range of about 100 to 160 feet (approximately 30 to 50 meters) which can be tracked using an application on a mobile device such as a smart phone. The Tag includes a battery that lasts for about 3 years. Battery can be replaced without removing the Tag from the surface to which it is adhered (e.g. the Tag can be adhered to a magnetic security tag or similar mechanism). Additionally the Tag can have a buzzer and light, allowing the Tag to be located easily among many items.

FIG. 13A depicts a schematic diagram of the embodiment of a circuit board 44' of a locator Tag 10' detailed with reference to FIG. 4A above.

Manager Application

On the store side, a management system, run on a manager computer, includes a Data Collection feature for managing inventory and a Virtual Leash feature, which sounds an alarm if a selected Tag goes beyond a predefined distance from the sensor (e.g. a shoplifting prevention feature which is configured to sound an alarm when a Tag goes beyond the perimeter of the store which may be calculated as a distance from the BLE sensor of the management computer or check-out counter.

The manager application is run on a computing device including Bluetooth or preferably BLE technology. Exemplarily a store manager can load the managing application on an iPad or the like, and scan the store to get accurate inventory information. The managing app then updates the server on inventory status. The app can also handle orders and to suppliers which can be automated.

Virtual Leash

The Virtual Leash feature allows a manager to create a 'virtual leash' on a selected Tag 10', so that if the Tag moves beyond a certain range, the application issues an alarm. In essence, the Virtual Leash feature is the opposite of the Find It feature. In use, the Virtual Leash feature can behave as an Anti-Theft mechanism which sounds an alarm if an item is removed from the store without payment (or without getting the Tag removed). Anti-theft sensors can determine if a Tag goes past and sound an alarm. At the exit of stores, OSUs scan with directional antennas for items that pass the exit. A siren can sound, or the store manager can get an alert, or the Mall police etc.

Blu Tracker

Figure 14:
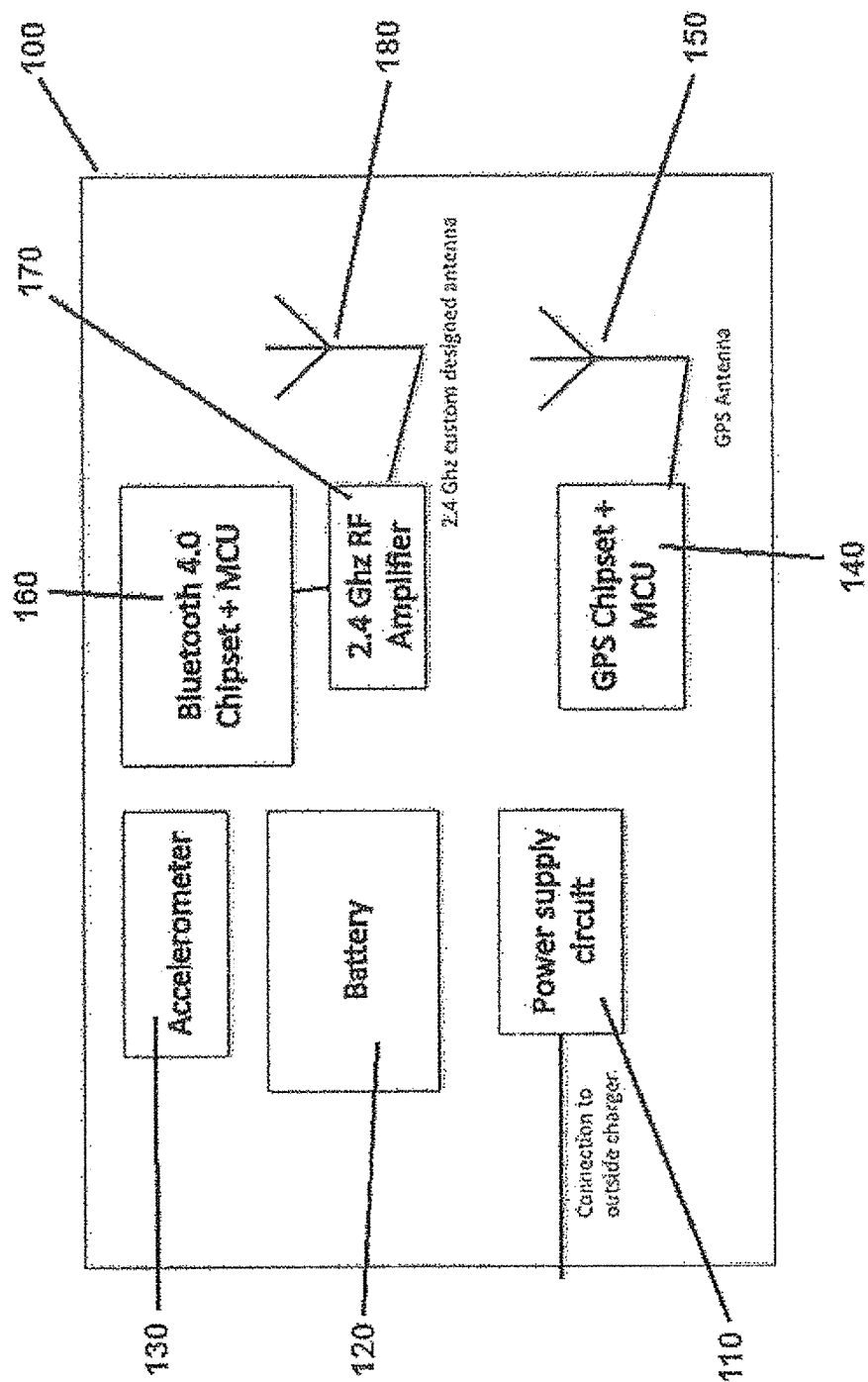
FIG. 14 is a block diagram of an ultra small Bluetooth GPS locator.

FIG. 14 is a block diagram of an ultra small Bluetooth UPS locator of the immediate invention. The innovative GPS locators broadcast their location using a Bluetooth transmitter. Typical GPS receivers have high power consumption and thus, if installed in a mobile device, consume the battery in a rather short time.

Furthermore, if the device is using Bluetooth communication to transmit its location to another device, the range between them is often limited to a few feet, due to the low strength of the Bluetooth signal.

The current invention aims to solve the aforementioned problems by utilizing an embedded accelerometer that turns on the device only when detecting motion and thus saves battery power when not moving. Accelerometer activation allows the device to operate up to two months without needing to charge. The device also utilizes a modified RE amplifier and omni directional antenna that amplify the Bluetooth signal in a way that allows the signal to reach a range of approximately 2000 feet.

A Tracker 100 of the immediate invention includes a power supply circuit 110 that charges a battery 120, when connected to an external charger. Exemplarily, charging the battery from empty to full status takes approximately 1 hour. An accelerometer 130 detects motion of the device. Whenever the device is in motion, a GPS chipset 140 is turned on at regular intervals (e.g. every 60 seconds) to acquire GPS location from GPS satellites via a GPS antenna 150. Once the GPS location is acquired, GPS chipset 140 goes into standby mode for the duration of the predetermined interval, thereby consuming very little power. When the accelerometer 130 detects no motion, GPS chipset 140 goes to sleep mode, consuming no power at all.

In the depicted exemplary embodiment, device 100 uses a Bluetooth 4.0 chipset 160, operationally coupled to a 2.4 GHz RF amplifier 170 and an omni directional antenna 180 to transmit the updated GPS location at regular predetermined intervals (i.e. once a second). After transmitting the location signal, the amplifier components are turned off for the duration of the interval, in order to reduce power consumption. Unlike regular Bluetooth devices that transmit a device ID in order to be paired with another Bluetooth device, the Bluetooth 4.0 chipset 160 transmits the GPS location instead of the device ID, so that a receiving device (e.g. mobile phone) does not need to be paired to the Tracker. The user only needs to monitor Bluetooth devices in the surroundings, and picking up just one packet of information from the Bluetooth transmitter will reveal the devices location to the user. Each GPS locator device can transmit its GPS location with a different encryption. This allows only the device owner to see its location and prevent "cross-talk" interference from other devices.

The user can download a special application to his mobile phone, which is designated to work with the OPS locator device. Exemplarily, the application allows the user to synchronize according to a predetermined device encryption, see the device location on a map, trigger an alarm whenever the GPS locator device distance from a certain point exceeds a predefined distance, etc.

For the indoor cases in which the device does not have GPS reception and location, the application can also calculate and display the estimated distance of the device according to the Bluetooth signal strength. The user turns the mobile phone around (doing a 360 degree circle), knowing the mobile phone antenna pattern and pointing direction (using the phone accelerometer or compass sensors), the application also calculates and displays the estimated direction of the device relative to the user. The graphic display of the current user position and the GPS locator device position are dynamically updated in such way that the user is able to distinguish if he is getting closer to the device or further away from the device.

The GPS locator device small size allows for attaching the device to a pet collar or leash, to a child's shoe, backpack, etc. The device case is designed for outdoor use (i.e it is hardened and water sealed).

While the invention has been described with respect to a limited number of embodiments, it will be appreciated that many variations, modifications and other applications of the invention may be made. Therefore, the claimed invention as recited in the claims that follow is not limited to the embodiments described herein.

Method of knowing if a customer is in front of a counter or standing in front of a cashier: By placing 2 Beacons, one after the other with a relative short distance of say 50 centimeters, being directly in line with the customer, the Phone will detect 2 Beacons. One, Beacon A, closer to the phone, placed on the edge of the counter, and another Beacon, Beacon B, 50 cm away father away from the first beacon. All the devices, the customer's phone, Beacon A then Beacon B on one linear line.

Because the greater the distance the RSSI values change and the greater the distance the less the RSSI changes, the phone will detect Beacon A as very close, say −60 dBM, and Beacon B, at say −70 dBM. If the phone detects a known difference between Beacon A to Beacon B that matches or near matches what is measured when provisioning the beacons at the counter, the phone can authenticate itself as being in front of the counter/Cashier. Someone else in the store, being at greater distance would detect both Beacons, A & B, at very similar RSSI values.

FIG. 15A illustrates a top view of an exemplary locator beacon 1500 of immediate invention. FIG. 15B depicts a side view of the locator beacon of FIG. 15A. Referring to both FIGS. 15A and 15B, a Bluetooth (BT) chipset 1502 is mounted on a printed circuit board (PCB) 1504. A first antenna (Ant A) 1506 is mounted on the left-hand side of the PCB and a second antenna (Ant B) 1508 is mounted on the left-hand side of the PCB. Both antennas are coupled to the chipset. A rectangular battery 1520 is mounted on the underside of the PCB (clearly visible in the profile view of FIG. 15B).

In the depicted configuration, the first antenna 1506 is configured to send a first signal and the second antenna 1508 is configured to send a second signal. In a preferred embodiment, the signals are wireless Bluetooth transmissions and even more preferably BT Low Energy (BTLE) transmissions. In the later case, the signal is generally broadcast over channels 37-39 which are commonly referred to as Advertising Channels in the BTLE protocol.

The distance between the first antenna and the second antenna is a known parameter and constant. In the current configuration the strength of the antennas is equal so that both transmit a signal of similar strength. The variations between the signals (which are inherent, as no two antennas send the exact same signal) is minimal and therefore, for the purposes of the immediate innovation, insignificant. When the antennas are set in a linear configuration (i.e. one antenna in from of the other), the strength of the two signals, measured at a given distance, will have a substantially constant delta A between them. The best results are achieved when the signal strengths are measured from a position in line with the two antennas (see FIG. 18D). The further away the signals are measured, the smaller the delta between the signals, until the difference between the signals becomes indistinguishable. The strength of the signal declines exponentially when moving away from the source of the signal.

One example of an algorithm for calculating RSSI is:

$$\text{RSSI (dBm)} = -10n^{log\ 10}(d) + A$$

d: distance in meters
A: received signal strength in dBm at 1 meter
n: propagation constant or path-loss exponent (Free space has n=2 for reference).

The present system is made viable largely due to the nature of the signal strength as it propagates over a distance. The device first in line will be able to distinguish a delta between the signal strengths but due to rapidly diminishing signal strength, the device that is second in line will register a delta between the two signals that is smaller (in a significant and quantifiable manner) than the delta registered by the first in line device. A target range of delta values for the first-in-line position can be Calculated, based on an algorithm similar to the abovementioned algorithm, so that even the second-in-line device will not be able to measure a delta value that is Within the target range of delta values for the first-in-line position. Only the first-in-line device will measure delta value that falls within the range. In some embodiments a target range of delta values for a second-in-line position is calculated as well. In still further embodiments, target ranges of delta values for the third, fourth, fifth etc. positions can also be calculated.

In view of the above, a person located at a predefined distance from the locator beacon (generally positioned in front of the beacon), with a device capable of measuring Received Signal Strength Indicator (RSSI) values, can measure a first RSSI value of the first signal and a second RSSI value from a second signal transmitted from the first and second antennas respectively. The delta value between the RSSI values will be equal to a predefined delta value (or within a predefined target range of values). Therefore, the device (e.g. a smartphone) that measures and calculates the predetermined delta value (or a value that falls within an acceptable range of values) between the first and second signals can be determined to be in the predefined location. In other embodiments, the device that measures the RSSI values does not calculate the delta value. Rather the system calculates the delta value. In still other embodiment both the device and the system calculate the delta. The measurements are very accurate when the mobile device is in line with the beacons (as shown in FIG. 18D).

Said in a different way, the first antenna and second antenna can be spaced apart such that a delta value between the first RSSI value, of the first signal, and the second RSSI value, of the second signal, which is measured at a predefined distance, will be equal to a predefined delta value. It is clear that various values will generally be ranges of values and not specific values. Or, said in another way, one value may not be equal to another value but may deviate from the target value within an accepted range of deviation.

In a second configuration (not shown), the two antennas may be spaced apart by a relatively shorter distance than in the first configuration. In order to differentiate between the two signals, one antenna may be configured to transmit a weaker or stronger signal than the other antenna. The signal transmission strength of the first antenna will now be different from the signal transmission strength of the other antenna. In this manner, the delta between the RSSI values is sufficiently large at the desired distance (e.g. the first-in-line position) so that the sources of the signals can still be distinguished, even though the antennas are not spaced as widely apart as in the first configuration.

Figure 16:
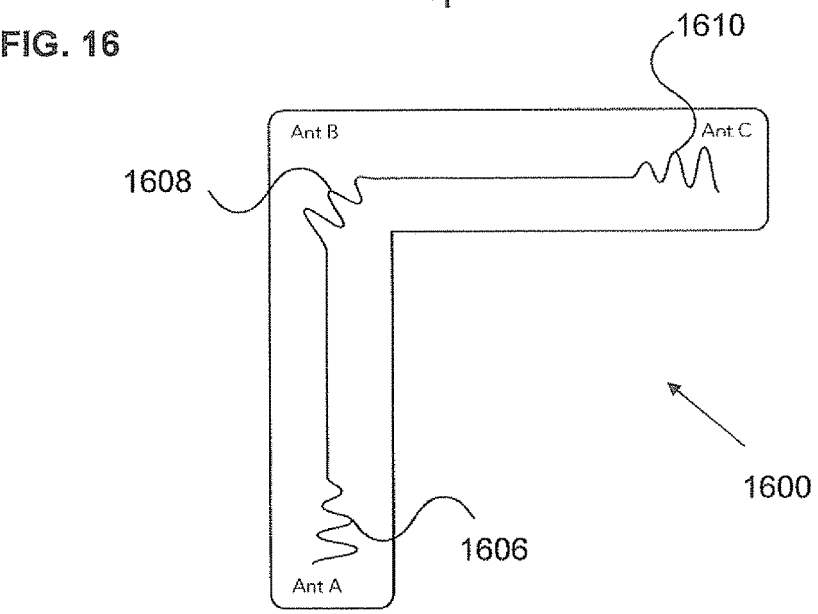
FIG. 16 is an exemplary configuration of a locator beacon with three antennas.

In a third configuration, the locator beacon has a third antenna. FIG. 16 illustrates an exemplary configuration of a locator beacon 1600 with three antennas. Exemplarily, the beacon may have an 'L'-shaped configuration, as shown in FIG. 16, such that the first and second antennas (Ant A and Ant B) 1606, 1608 are positioned in a linear fashion and a third antenna (Ant C) 1610 is parallel to Ant B 1608. The third antenna sends a third signal. A measuring device measures the three RSSI values of the three signals and identifies which antenna each signal was sent from (e.g. according to the UUID of the antenna included in the signal). The measuring device (e.g. a smartphone) knows which position each antenna is in and therefore can determine whether the device is in the predefined location based on the delta between the RSSI values of the signals from Ant A and Ant B, and can further determine in which direction the measuring device is located, relative to the locator beacon, based on the strength of the third signal relative to the other two signals.

Figure 17:
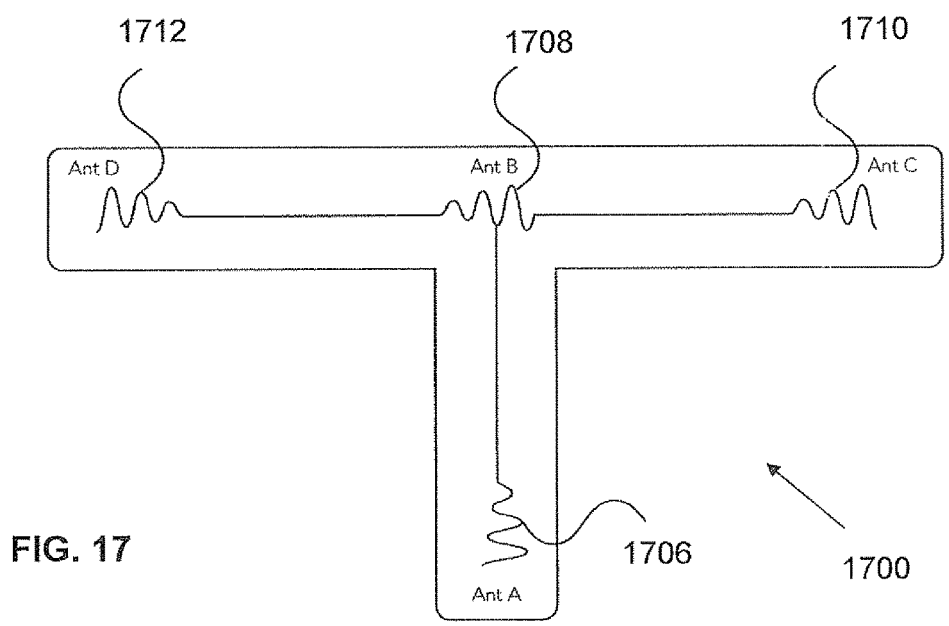
FIG. 17 is an exemplary configuration of a locator beacon 1700 with four antennas.

In a fourth configuration, the locator beacon has four antennas. FIG. 17 illustrates an exemplary configuration of a locator beacon 1700 with four antennas. Exemplarily, the beacon may have an 'T'-shaped configuration, as shown in FIG. 17, such that the first and second antennas (Ant A and Ant B) 1706, 1708 are positioned in a linear fashion and a third antenna (Ant C) 1710 is parallel to Ant B 1708 and located on the right side of the beacon. A fourth antenna (Ant D) 1712 is located parallel to Ant B and Ant C, and located on the left side of the beacon.

The fourth antenna sends a fourth signal. A measuring device measures the four RSSI values of the four signals and identifies which antenna each signal was sent from (e.g. according to the MID of the antenna included in the signal). The measuring device (e.g. a smartphone) knows which position each antenna is in and therefore can determine whether the device is in the predefined location based on the delta between the RSSI values of the signals from Ant A and Ant B, and can further determine in which direction the measuring device is located, relative to the locator beacon, based on the strengths of the third signal and the fourth signal relative to the other two signals and/or relative to each other.

Figure 18A:
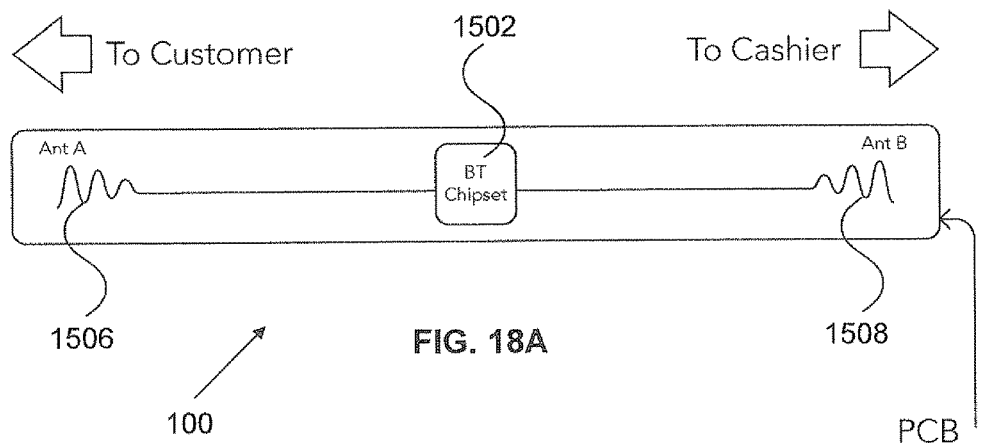
FIG. 18A is a depiction of the locator beacon of FIG. 1A, affixed according to a specific orientation.
Figure 18B:
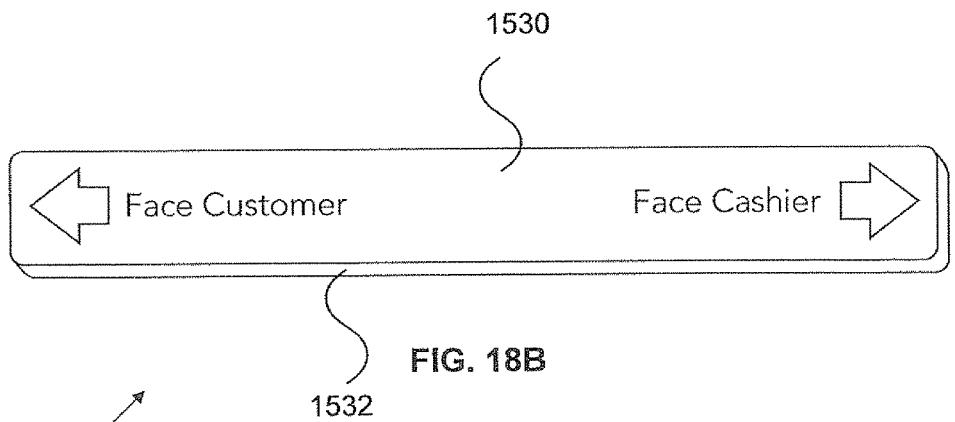
FIG. 18B is a depiction of the locator beacon of FIG. 18A encased in a cover.
Figure 18C:
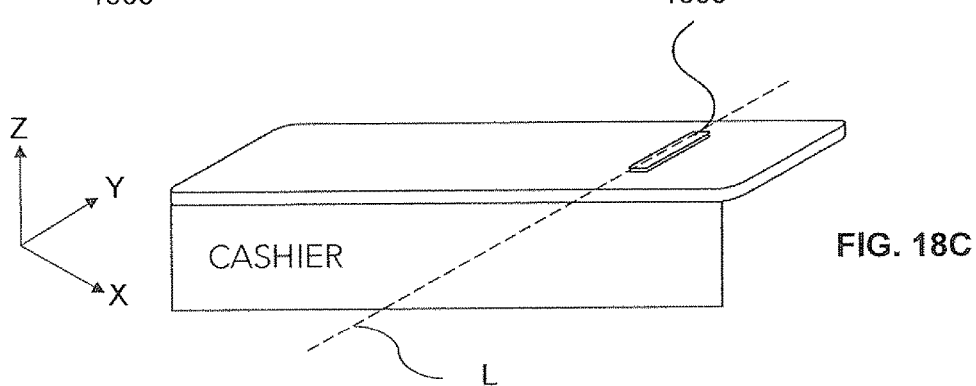
FIG. 18C is a pictorial depiction of the locator beacon of FIG. 18B affixed to a cashier counter.
Figure 18D:
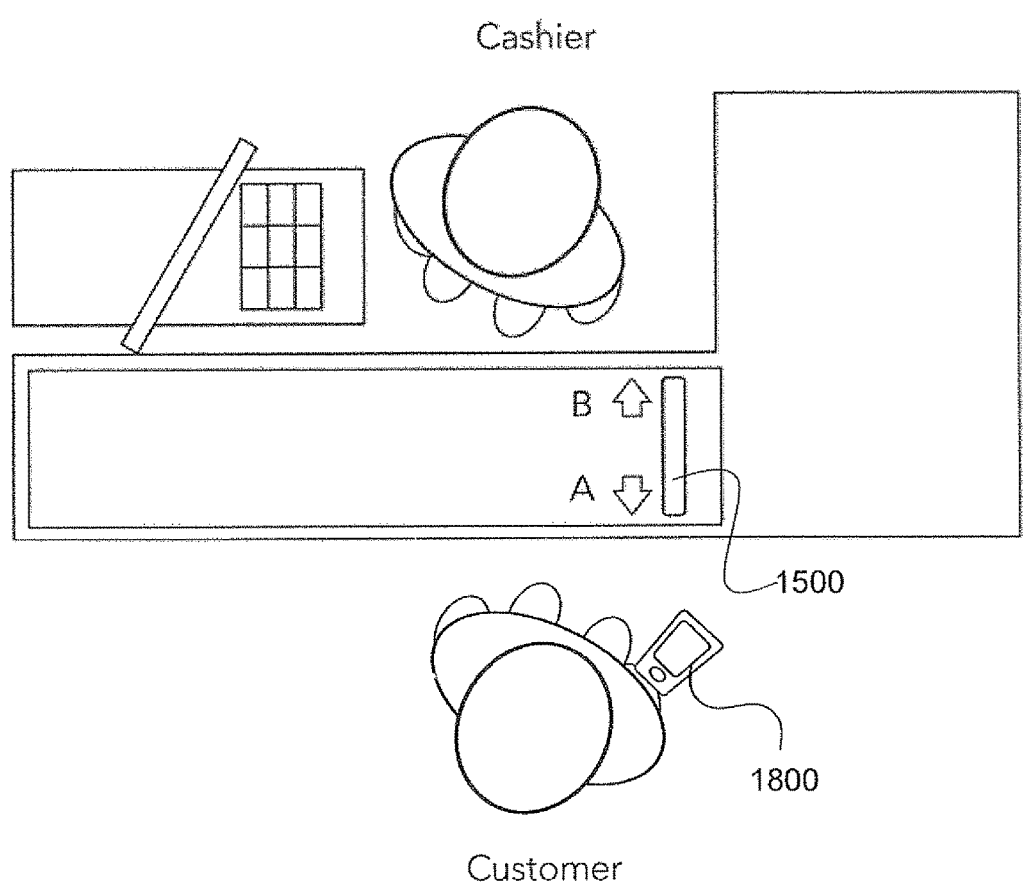
FIG. 18D is a pictorial depiction of an exemplary use-case scenario of the present system.

FIG. 18A depicts the locator beacon of FIG. 15A, affixed according to a specific orientation. In the Figure, beacon 1500 is positioned so that Ant A 1506 is located closer to a customer and Ant B is located closer to a cashier. It is clear that the customer and cashier are merely exemplary use cases and not deemed limiting. FIG. 18B illustrates the locator beacon of FIG. 18A encased in a cover including directions for positioning the locator beacon. Covering 1530 covers and protects the internal components of the beacon. An adhesive, magnet or any other type of adherent 1532 is affixed to the underside of the beacon/casing. FIG. 18C depicts the locator beacon of FIG. 18B affixed to a cashier counter, in an exemplary use case scenario.

In a preferred embodiment, the first and second antennas define a Y axis, as shown in FIG. 15B. An X-axis is perpendicular to the Y-axis. A Z-axis is perpendicular to both the X- and Y-axes and denotes height, bisecting the X-Y plane. A plane P (not shown in the Figures) is defined by the Y-axis and the Z-axis. In FIG. 18C a line L runs along the Y-axis. In a preferred embodiment, the mobile device intersects line L, i.e. the mobile device is in line with the locator beacon and at the same height as the beacon (at the predefined distance). In another preferred embodiment, the mobile device intersects plane P, i.e. the mobile device is directly in line with the locator beacon, but higher or lower than the level of the beacon. Line L denotes the preferred direction for positioning the mobile device. It is clear that a certain deviation from the line L and even from plane P. I.e. even if the device is not exactly lined up with the two antennas, the system will still be able to determine a first-in-line position. There is a certain tolerance left or right, up or down from the optimal position discussed above. Similarly, as hinted to above, there is a certain tolerance regarding the distance from the locator beacon. As long as the device is within that tolerance, the device will be determined to be in the first-in-line position.

The locator beacon of the present invention (e.g. the first or second configurations discussed above) can be integrated into a larger system, for example, a system for identifying a first-in-line device. FIG. 18D illustrates an exemplary use-case scenario of the aforementioned system. In the exemplary Figure, the first position in a queue in front of a cashier can be calculated to have a particular delta value. A Customer stands in the first position in the queue with a mobile device (such as a smartphone) 1800. The mobile device receives the signals that are broadcast from the two antennas of the beacon 1500 and calculates a delta value between the measured RSSI values. The Ant A 1506 of beacon 1500 is located closer to the customer (e.g. on the customer side of the till) and Ant B 1503 is located closer to the cashier (e.g. on the cashier side of the till).

The linear arrangement of the antennas causes the difference between the signal strengths measured by the mobile device. The strength of the signal from Ant A 1506 measured by mobile device 1800 is higher than the strength of the signal from Ant B 1508 measured by the mobile device due to the distance between the antennas and the linear arrangement thereof. In the first configuration, the initial strength of the signals is substantially the same but becomes exponentially reduced as the signal moves away from the transmitter, as mentioned above. In the second configuration, the initial strength of the signals is different to provide a predefined delta at a predefined distance (possibly very similar to the delta and distance of the first configuration), while having a more compact beacon where the antennas are closer together.

For example, mobile device 1800 will detect the signal from. Ant A as very close, e.g. −60 dBM, and the signal from Ant B as, for example, −70 dBM. If |10|dBM is the predetermined delta value (or within the acceptable range of deviation from the predetermined delta value) between the first and second signal, then device 1800 is in the first in line position. Mobile device 1800 then transmits an authentication signal, to announce that the device is in the predetermined first-in-line position.

FIG. 19 is a diagram of a system 1900 of the present innovation. The system includes a main server/computer 1910, such as a store server. The server may be connected to a network/computer cloud or may be a standalone system. In some embodiments the server is connected to a storage device 1902 or devices, whereas in other embodiments the storage component is integrated into the server/computer. In the former embodiment, the storage device or devices may be collocated or remotely located and connected to the server via a network and/or the Internet.

The system includes a Point-Of-Sale/Point-of-Service (POS) 1920, such as a cashier, or similar physical object that a customer interacts with. The term POS is used generically herein to mean any location where a locator beacon is installed. The POS includes at least one locator beacon 1930. The locator beacon can have two, three, four or more antennas. A customer interfaces with the system via a mobile wireless device. For example, a customer (e.g. store customer, train passenger, airplane passenger etc.) can interface with system via a mobile device 1940.

The system further includes a Receiver 1912 for receiving wireless signals. In one embodiment the receiver is integrated into the main computer 1910. In another embodiment the receiver is external to the main computer. In other embodiments, a network of receivers are connected to the main computer (in a wired or wireless configuration), to allow for wider and/or better coverage. The receiver 1912 is configured to receive an authentication signal from the mobile device 1940. The authentication signal includes Authentication Data that is related to the first and second measured RSSI values.

The system further includes a processing unit 1914 which is configured to determine whether the mobile device is the first-in-line device or not. The processing unit has to determine a delta value between the first and second RSSI values measured by the mobile device is within the predefined range of values, which will determine whether the mobile device is in the first in line position or not.

In one configuration, the authentication data includes the delta value calculated between the first RSSI value of the first signal and the second RSSI value of the second signal from a locator beacon 1932 with two antennas. In this configuration the mobile device first measures the RSSI values and then calculates the delta between the values. The delta value calculated by the device is then sent as part of the authentication data in the authentication signal. In one embodiment, the mobile device known the predefined delta value range and only sends the Authentication Signal is the calculated delta value is within the predetermined range.

A mobile application is part of the system and a copy of the application can be downloaded from the main computer or a remote location (i.e. Apple Store, iTunes, Google Play etc.) to the mobile device. The application is stored and installed on the mobile device and can be preconfigured with the necessary data and functions described above. Alternatively or additionally, the application may be configured to receive updated information or location specific information from a local system (e.g. system computer 1910). For example, when the user enters a local branch of a chain store, the application is automatically updated with the specific delta values for the various first-in-line positions for each of the cashiers. When the user approaches one specific cashier, the application identifies the particular cashier and compares the calculated delta value to the range of values specific to the cashier. If the calculated delta is within the range then an Authentication Signal is sent to the system.

In a second configuration, the authentication data only includes the first and second measured RSSI values. In this configuration the system calculates the delta value, not the mobile device. The system can then decide which mobile device in the first-in-line position. The second configuration also includes a mobile application for measuring the RSSI values and transmitting the data to the system.

In some embodiments, the unique user identifier (UUID) of the mobile device is included in the Authentication Signal. The UUID can be cross-linked to the owner of the device, e.g. from a database 1902 with that information. The system has now identified the specific customer standing first in line. Once the specific customer is identified the system can then apply any preprogrammed logic specific to the customer. For example, the system can automatically register a membership card which provides automatic benefits (e.g. certain percentages of specific items etc.), or the system can automatically access an electronic wallet to pay for the goods the customer is purchasing, or suggest tailored benefits based on purchase history, etc.

In a third configuration of the system, the system includes a third antenna at the POS. In one embodiment the three antennas are integrated in a locator beacon 1934 which is similar to locator beacon 1600 (in FIG. 16). In another embodiment, the third antenna is in a separate device. The third antenna is configured to send a third signal. The third antenna is located in a known position relative to the first and second antennas, for example in an L-shape configuration discussed above in relation to FIG. 16. In the third configuration, the authentication data is further related to a third RSSI value, of the third signal, measured by mobile device 1940. The processing unit is further configured to determine a direction between mobile device 1940 and the locator beacon 1934, based on the authentication data and the known configuration of the antennas.

In a fourth configuration of the system, the system includes a fourth antenna. In one embodiment the four antennas are integrated in a locator beacon 1936 which is similar to locator beacon 1700 (in FIG. 17). In another embodiment, the fourth antenna is in a separate device. The fourth antenna is configured to send a fourth signal. The fourth antenna located in a known position relative to the first, second and third antennas, for example in the T-shaped configuration discussed above in relation to FIG. 17. In the fourth configuration, the authentication data is further related to a fourth RSSI value of the fourth signal measured by mobile device 1940. The processing unit is further configured to determine a direction between mobile device 1940 and the locator beacon, based on the authentication data and the known configuration of the antennas. The main computer is connected to the POS and informs a computer 1922 at the POS that mobile device 1940 is the first-in-line device.

FIG. 22 illustrates another exemplary use-case scenario of the aforementioned system. In the exemplary scenario, there are four cashiers and four customers in line for each cashier. Due to the close proximity of customers, the system must be able to distinguish which customer is in front of which cashier as well as the position of each customer in each respective line. The cashier on the far left is designated CA1, the cashier to the immediate right of CA1 is designated CA2 and moving to the right the cashiers are designated CA3 and CA4 respectively. The first customer in line in front of cashier CA1 is designated CU1-1. The second in line is designated CU1-2. The customers in the third and fourth positions in the first line are designated CU1-3 and CU1-4 respectively. The customer in front of cashier CA2 is designated CU2-1. The customer immediately behind customer CU2-1 is CU2-2. The designations of the remaining customers follow the same pattern.

In the depicted scenario, customer CU2-1 is the first customer in front of cashier CA2. The proximity to cashiers CM and CA3 may make it difficult for the system to decide in front of which cashier the customer is standing. In such a scenario, having three or four antennas can help verify the exact position of the customer. In one embodiment the three antennas are in a single beacon, such as the beacon depicted in FIG. 2. In another embodiment, the three antennas include two antennas in the locator beacon at cashier CA2 and one antenna at cashier CA1. The RSSI values of the three beacons are analyzed by the system to determine that customer CU2-1 is in fact in the first-in-line position in front of cashier CA2.

In other embodiments, four antennas are used to triangulate the position of each customer. In one embodiment, the four antennas are integrated into a single locator beacon, such as the locator beacon depicted in FIG. 3. In another embodiment two locator beacons can be used, each with two antennas, where one is arranged horizontally and the other vertically, forming a T-shaped configuration with four antennas. In still another embodiment, the four antennas include two antennas in the locator beacon in from of the cashier CA2, and one antenna from the locator beacon in front of cashier CA1 and a fourth antenna from the locator beacon in front of cashier CA3. The mobile device of customer CU2-1 records all the RSSI values of the various signals and transmits the RSSI values to the system. The system can then determine, by triangulation, exactly where customer CU2-1 is located.

In a different exemplary embodiment, the first-in-line system and method can be used for various transportation passes and the like. For example, an airport with an electronic gate can identify the traveler standing first-in-line before the gate. The system can access the electronic wallet of the traveler and extract the digital boarding pass data from the wallet. The system cross-checks and confirms the data as necessary and allows the traveler through the gate. Similar systems can be implemented for buses, trains, subways etc. Of course, additional security measures can be included in the system such a biometric reader etc.

FIG. 20 illustrates a flow diagram 2000 of a method for identifying a first-in-line device. The method includes the following steps:

Step 2001—adjust power of one of a first antenna or a second antenna. Alternatively, provide a first antenna having a first transmission strength and a second antenna having a second transmission strength different from the first transmission strength. In some embodiments, step 2001 is skipped.

Step 2002—broadcast a first signal from the first antenna.

Step 2004—broadcast a second signal from the second antenna.

Step 2006—receive an authentication signal from a mobile device that measured a first RSSI value of the first signal and a second RSSI value of the second signal. The authentication signal includes authentication data related to the measured RSSI values.

Step 2008—determine whether the mobile device is the first-in-line device, based on whether a delta value between the first RSSI value and the second RSSI value is within a predefined value range.

In one embodiment of the method, the authentication data includes the first and second measured RSSI values. In another embodiment, the authentication data includes the calculated delta value. Here, the mobile device calculates the delta value. In some embodiments, the mobile device only sends the authentication signal if the calculated delta value is equal to the predetermined delta value or within the predetermined range of values.

Step 2010—identify a mobile device owner based on the authentication signal received from the mobile device. The authentication signal includes a unique user identifier related to the mobile device owner. In some embodiments, step 2010 is skipped.

Step 2012—broadcast a third signal from a third antenna, where the first, second and third antennas are positioned in a known configuration. In some embodiments, step 2012 is skipped. In an embodiment where only three antennas broadcast signals, go to step 2014. In an embodiment where four antennas broadcast signals, go to step 2016.

Step 2014—identify a direction in which the mobile device is located relative to the first, second and third antennas, based on the known configuration of the antennas. In some embodiments, steps 2012 and 2014 are skipped.

Step 2016—broadcast a fourth signal from a fourth antenna where the first, second, third and fourth antennas are positioned in a known configuration.

Step 2018—identify a direction in which the mobile device is located relative to the first, second, third and fourth antennas, based on the known configuration of the antennas.

FIGS. 21A-21D illustrate various alternative configurations of locator beacons. Referring to FIG. 21A, the Figure depicts a bottom view of a beacon with a single button battery 2120A. The antennas on the top side of the PCB are obscured by the PCB and therefore shown in phantom lines. Referring to FIG. 21B, the Figure depicts a bottom view of an exemplary beacon with five button batteries 2120B. The antennas on the top side of the PCB are obscured by the PCB and therefore shown in phantom lines.

Referring to FIG. 21C, the Figure depicts a bottom view of an exemplary beacon with a rectangular battery 2120C. A first antenna 2106C on the left hand side and the second antenna on the right hand side are on the top side of the PCB are obscured by the PCB and therefore shown in phantom lines. FIG. 210 is a top view of another exemplary beacon. The beacon includes a first antenna 21060 on the left side of the figure, a second antenna 21080 on the right side of the Figure, a chipset 2102D and five button batteries 2121D, 2122D, 2123D, 2124D and 2125D.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A locator beacon comprising:
    (a) a first antenna configured to send a first signal;
    (b) a second antenna configured to send a second signal, said second antenna spaced apart from said first antenna such that there is a delta value between a first Received Signal Strength Indicator (RSSI) value of said first signal and a second RSSI value of said second signal, wherein said delta value is non-proportionately higher when said signals are measured closer to said antennas, and non-proportionately lower when said signals are measured farther away from said antennas;
    (c) a receiver adapted to receive wireless signals, said receiver configured to receive an authentication signal from a mobile device adapted to measure said first RSSI value and said second RSSI value, said authentication signal including authentication data related to said measured RSSI values;
    (d) a processing unit, said processing unit configured to determine whether said mobile device is a first-in-line device based on whether said delta value between said first RSSI value and said second RSSI value is within said predefined range of values; and
    (e) a third antenna configured to send a third signal, said third antenna located in a known position relative to said first and second antennas,
    wherein said authentication data is further related to a third RSSI value of said third signal measured by said mobile device, and
    wherein said processing unit is further configured to determine a direction between said mobile device and said locator beacon, based on said authentication data.

2. The locator beacon of claim 1, wherein said first antenna is predefined to have a signal transmission strength which differs from a signal transmission strength of said second antenna by a known value.

3. The locator beacon of claim 1, further comprising:
    (g) a fourth antenna configured to send a fourth signal, said fourth antenna located in a known position relative to said first, second and third antennas such that measuring said first, second and third RSSI values and a fourth RSSI value of said fourth signal enables a measuring device to determine a direction between said measuring device and the locator beacon.

4. The locator beacon of claim 1, wherein said first and second antennas define an axis along which a line runs, such that said predefined approximate location intersects said line.

5. The system of claim 1, wherein said authentication data includes said first and second measured RSSI values.

6. The system of claim 1, wherein said authentication data includes said delta value.

7. The system of claim 1, wherein said processing unit is further configured to identify a mobile device owner based on said authentication signal received from said mobile device, wherein said authentication signal includes a unique user identifier related to said mobile device owner.

8. The system of claim 1, further comprising:
    (f) a fourth antenna configured to send a fourth signal, said fourth antenna located in a known position relative to said first, second and third antennas,
    wherein said authentication data is further related to a fourth RSSI value of said fourth signal measured by said mobile device, and
    wherein said processing unit is further configured to determine a direction between said mobile device and said locator beacon, based on said authentication data.

9. The system of claim 1, wherein said processing unit is further configured to determine whether said mobile device is in a respective predefined position based on whether said delta value is within a predefined range of values specific to said respective predefined position.

10. A method for identifying a location of a device, the method comprising the steps of:
    (a) providing a first device including:
        (i) a first antenna configured to send a first signal;
        (ii) a second antenna configured to send a second signal, said second antenna spaced apart from said first antenna such that there is a delta value between a first Received Signal Strength Indicator (RSSI) value of said first signal and a second RSSI value of said second signal wherein said delta value is non-proportionately higher when said signals are measured closer to said antennas, and non-proportionately lower when said signals are measured farther away from said antennas;
        (iii) a receiver adapted to receive wireless signals, said receiver configured to receive an authentication signal from a mobile device adapted to measure said first RSSI value and said second RSSI value, said authentication signal including authentication data related to said measured RSSI values;
        (iv) a processing unit, said processing unit configured to determine whether said mobile device is a first-in-line device based on whether said delta value between said first RSSI value and said second RSSI value is within said predefined range of values; and
        (v) a third antenna configured to send a third signal, said third antenna located in a known position relative to said first and second antennas,
        wherein said authentication data is further related to a third RSSI value of said third signal measured by said mobile device, and
        wherein said processing unit is further configured to determine a direction between said mobile device and said locator beacon, based on said authentication data
    (b) broadcasting said first signal from said first antenna;
    (c) broadcasting said second signal from said second antenna;
    (d) receiving a signal from a second device, said second device being wirelessly-enabled and measuring said first RSSI value of said first signal and said second RSSI value of said second signal; and
    (e) calculating a relative distance of said second device to one of said first and second antennas by measuring said delta value between said first RSSI value and said second RSSI value when said signal are measured at a predefined approximate location.

11. The method of claim 10, further comprising the step of:

(f) identifying a second device owner based on said signal received from said second device, wherein said signal includes a unique user identifier related to said second device owner.

12. The method of claim 10, wherein said first antenna and said second antenna are embodied on a single substrate.

13. The method of claim 10, further comprising the steps of:
(f) broadcasting the third signal from the third antenna;
(g) broadcasting a fourth signal from a fourth antenna, said first, second, third and fourth antennas positioned in a known configuration; and
(h) identifying a direction in which said mobile device is located relative to said first, second, third and fourth antennas, based on said known configuration.

14. The method of claim 10, further comprising the step of:
(f) adjusting power of one of said first and second antennas, step (f) being performed before step (b).

15. The method of claim 10, further comprising the step of:
(f) providing said first antenna having a first transmission strength and said second antenna having a second transmission strength different from said first transmission strength by a predefined intensity, step (f) being performed before step (b).

16. The method of claim 10, wherein said first antenna is embodied on a first substrate and said second antenna is embodied on a second substrate.

17. The method of claim 10, wherein said signal from said second device includes said first and second measured RSSI values.

18. The method of claim 10, wherein said signal from said second device includes said delta value.

* * * * *